(12) United States Patent
Padaki et al.

(10) Patent No.: US 11,558,081 B1
(45) Date of Patent: Jan. 17, 2023

(54) DATA TRANSFER PROTOCOL FOR ULTRA-WIDEBAND (UWB)

(71) Applicant: Amazon Technologies, Inc., Seattle, WA (US)

(72) Inventors: Aditya V. Padaki, Richardson, TX (US); Sai Prashanth Chinnapalli, Dublin, CA (US)

(73) Assignee: Amazon Technologies, Inc., Seattle, WA (US)

( * ) Notice: Subject to any disclaimer, the term of this patent is extended or adjusted under 35 U.S.C. 154(b) by 48 days.

(21) Appl. No.: 17/339,884

(22) Filed: Jun. 4, 2021

(51) Int. Cl.
*H04B 1/71* (2011.01)
*H04B 1/7176* (2011.01)
*H04L 1/18* (2006.01)
*H04W 4/80* (2018.01)

(52) U.S. Cl.
CPC ............. *H04B 1/7176* (2013.01); *H04L 1/18* (2013.01); *H04W 4/80* (2018.02)

(58) Field of Classification Search
CPC ........... H04B 1/7176; H04L 1/18; H04W 4/80
See application file for complete search history.

(56) References Cited

U.S. PATENT DOCUMENTS

| | | | |
|---|---|---|---|
| 2021/0072373 A1* | 3/2021 | Schoenberg | G01S 13/765 |
| 2022/0061043 A1* | 2/2022 | Yoon | H04W 72/0446 |
| 2022/0210631 A1* | 6/2022 | Lee | H04W 8/005 |
| 2022/0271794 A1* | 8/2022 | Aldana | H04B 1/7183 |

* cited by examiner

*Primary Examiner* — Dac V Ha
(74) *Attorney, Agent, or Firm* — Lowenstein Sandler LLP

(57) ABSTRACT

Technologies directed to data transfer protocols for Ultra-Wideband (UWB) are described. One method includes a UWB radio of a first device receiving first data from an application. The first device sends data to second and third devices, the data identifying a number of data rounds, a duration of each round, a duration of a data slot, a duration of a data block, and a first slot index for the second device and a second slot index for the third device. The first device sends, during a first slot associated with the first slot index, the first data to the second device using the UWB radio. The first device sends, during a second slot associated with the second slot index, the first data to the third device using the UWB radio.

20 Claims, 14 Drawing Sheets

| Output Power limit | -41.3 | dBm/MHz/ms |
|---|---|---|
| Output Power (500MHz) | -14.3 | dBm/ms |
| Typical packet length | 100 | us |
| Duty cycle/ms | 40% | |
| Tx Power | -10.3 | dBm |
| Typical Rx Sensitivity | -97 | dBm |
| Front End Loss | 2 | dB |
| Rx Antenna Gain | 0 | dBi |
| Path Loss | 84.7 | dB |
| Additional Blockage | 3 | dB |
| Total Tolerable Path Loss | 81.7 | dB |

| Output Power limit | -41.3 | dBm/MHz/ms |
|---|---|---|
| Output Power (500MHz) | -14.3 | dBm/ms |
| Typical packet length | 100 | us |
| Duty cycle/ms | 40% | |
| Tx Power | -14.3 | dBm |
| Typical Rx Sensitivity | -97 | dBm |
| Front End Loss | 2 | dB |
| Rx Antenna Gain | 0 | dBi |
| Path Loss | 84.7 | dB |
| Additional Blockage | 3 | dB |
| Total Tolerable Path Loss | 77.7 | dB |

1102 — IEEE Pathloss Model B
1106 — IEEE Pathloss Model C

| Freq. (Hz) | 6.5E+09 | 7000000000 | 7.5E+09 | 8E+09 | 6.5E+09 | 7E+09 | 7.5E+09 | 8E+09 |
|---|---|---|---|---|---|---|---|---|
| Distance (m) | Ch 5 | Ch 6 | Ch 8 | Ch 9 | Ch 5 | Ch 6 | Ch 8 | Ch 9 |
| 1 | 51.75827 | 52.4019608 | 53.001225 | 53.5618 | 51.75827 | 52.40196 | 53.00123 | 53.5618 |
| 2 | 57.77887 | 58.42256071 | 59.021825 | 59.5824 | 57.77887 | 58.42256 | 59.02183 | 59.5824 |
| 3 | 61.30069 | 61.94438589 | 62.54365 | 63.104225 | 61.30069 | 61.94439 | 62.54365 | 63.10422 |
| 4 | 63.79947 | 64.44316063 | 65.042425 | 65.603 | 63.79947 | 64.44316 | 65.04243 | 65.603 |
| 5 | 65.73767 | 66.38136089 | 66.980625 | 67.5412 | 65.73767 | 66.38136 | 66.98063 | 67.5412 |
| 6 | 69.50901 | 70.1527045 | 70.751969 | 71.312543 | 70.50901 | 71.1527 | 71.75197 | 72.31254 |
| 7 | 71.85215 | 72.49584214 | 73.095107 | 73.655681 | 72.85215 | 73.49584 | 74.09511 | 74.65568 |
| 8 | 73.88187 | 74.52556028 | 75.124825 | 75.685399 | 74.88187 | 75.52556 | 76.12482 | 76.6854 |
| 9 | 75.6722 | 76.31589857 | 76.915163 | 77.475738 | 76.6722 | 77.3159 | 77.91516 | 78.47574 |
| 10 | 77.27372 | 77.91741074 | 78.516675 | 79.07725 | 78.27372 | 78.91741 | 79.51668 | 80.07725 |
| 11 | 78.72246 | 79.36615472 | 79.965419 | 80.525994 | 79.72246 | 80.36615 | 80.96542 | 81.52599 |

DATA TRANSFER PROTOCOL FOR ULTRA-WIDEBAND (UWB)

BACKGROUND

A large and growing population of users is enjoying entertainment through the consumption of digital media items, such as music, movies, images, electronic books, and so on. The users employ various electronic devices to consume such media items. Among these electronic devices (referred to herein as endpoint devices, user devices, clients, client devices, or user equipment) are electronic book readers, cellular telephones, personal digital assistants (PDAs), portable media players, tablet computers, netbooks, laptops, and the like. These electronic devices wirelessly communicate with a communications infrastructure to enable the consumption of digital media items. In order to wirelessly communicate with other devices, these electronic devices include one or more antennas.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

FIG. 11A is a lookup table with transmit power values associated with different channels and distances, according to at least one embodiment.

FIG. 11B illustrates a link budget for a data transfer between a controller and a controlee, according to at least one embodiment.

FIG. 11C illustrates a link budget for a data transfer between a controller and a controlee, according to at least one embodiment.

DETAILED DESCRIPTION

Technologies directed to data transfer protocols for Ultra-Wideband (UWB) are described. UWB is a radio technology that can use low energy levels for short-range, high-bandwidth (e.g., greater than 500 MHz or 20% of the arithmetic center frequency) communications over a large portion of the radio spectrum. The FCC authorizes the unlicensed use of UWB in the frequency range of 3.2 to 10.6 GHz. The high bandwidth allows for the transmission of a large amount of signal energy without interfering with narrowband and carrier wave transmission in the same frequency band. Multiple devices in a wireless network use the same wireless channel or adjacent wireless channels in many cases. In some frequency bands, adjacent channel interference is worse than when operating in the same channel. Currently, wireless devices can use a distributed channel access scheme, such as carrier-sense multiple access with collision avoidance (CSMA/CA), in which a node attempts to avoid collisions by beginning a transmission only after a channel is sensed to be "idle." Due to the nature of distributing channel access schemes (e.g., CSMA/CA), wireless devices may suffer severe medium access contention.

In some cases, a wireless device can be aggressive for transmissions and can reduce an overall network capacity of the wireless network. UWB does not have a CSMA/CA mechanism or a fair channel use mechanism. As a result, the primary usage of UWB is limited to ranging, such as in precision locating and tracking applications. Its precision capabilities and low power make it well suited for radio-frequency-sensitive environments. UWB has not been used for data transfers since the data frames are longer than the ranging frames, and UWB does not have mechanisms for CSMA/CA or fair channel usage for spectrum co-existence for these longer data frames.

Aspects of the present disclosure address the above and other deficiencies by providing a UWB media access control (MAC) protocol for data transfers. Aspects of the present disclosure can use the UWB MAC protocol for data transfers within an intelligent audio streaming system. For example, a controller (e.g., a first Echo Family Device (EFD)) receives audio from the Internet and transfers the audio data to multiple controlees (other EFDs in a 5.1 or 7.1 audio system) using the UWB MAC protocol. Aspects of the present disclosure also provide a channel hopping mechanism in which session control is used for ensuring fair channel usages and spectrum co-existence. Aspects of the present disclosure also provide a distance-based power control mechanism for ensuring fair channel usage and spectrum co-existence. Aspects of the present disclosure can be used in connection with other radio technologies, including wireless local area network (WLAN) (e.g., Wi-Fi® technology) and wireless personal area network (PAN) technologies (e.g., Bluetooth® and Bluetooth® Low Energy (BLE)).

Figure 1:
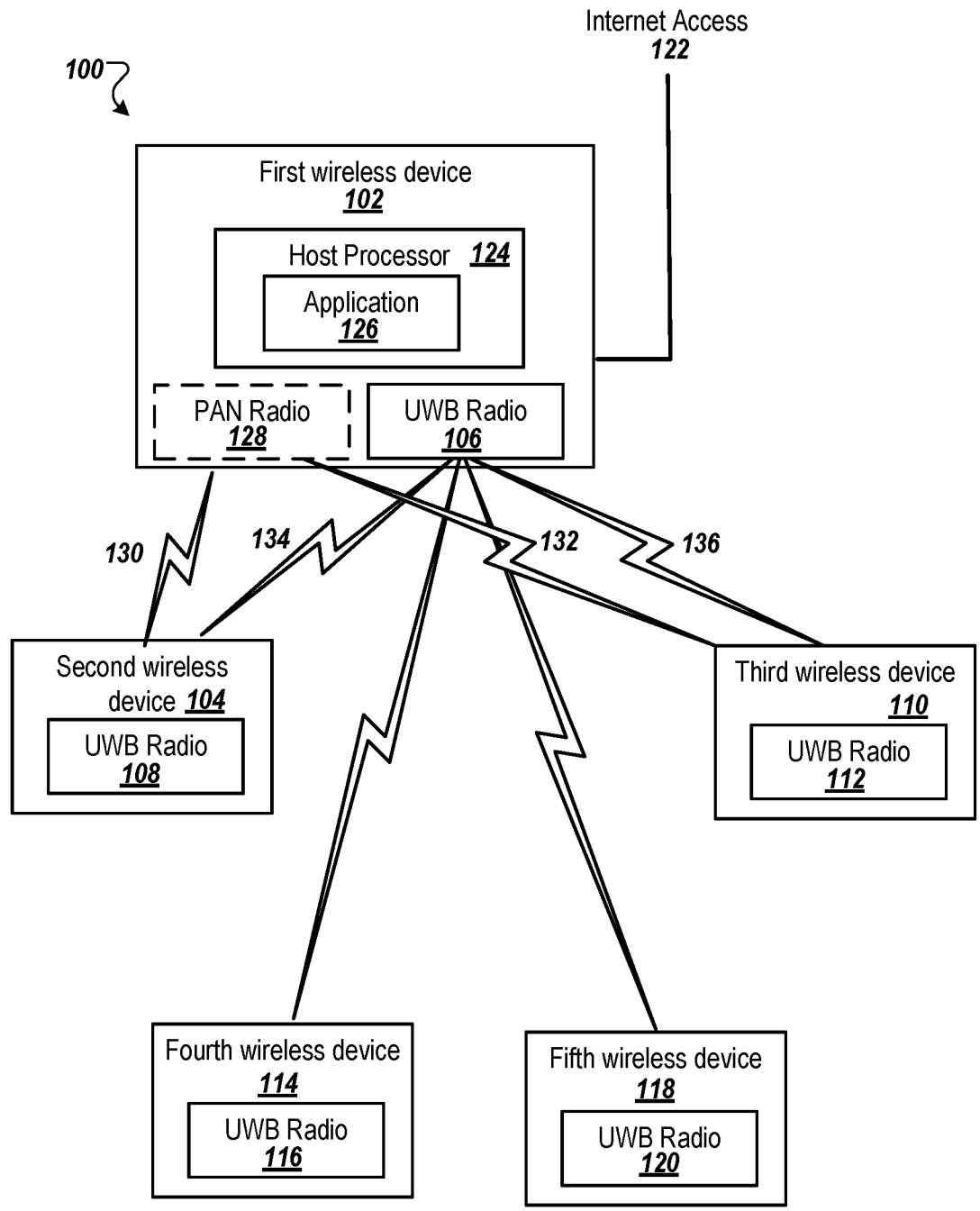
FIG. 1 is a network diagram of a wireless network with a first wireless device with an ultra-wideband (UWB) radio with media access control (MAC) circuitry for data transfers to a second wireless device, according to at least one embodiment.
Figure 2:
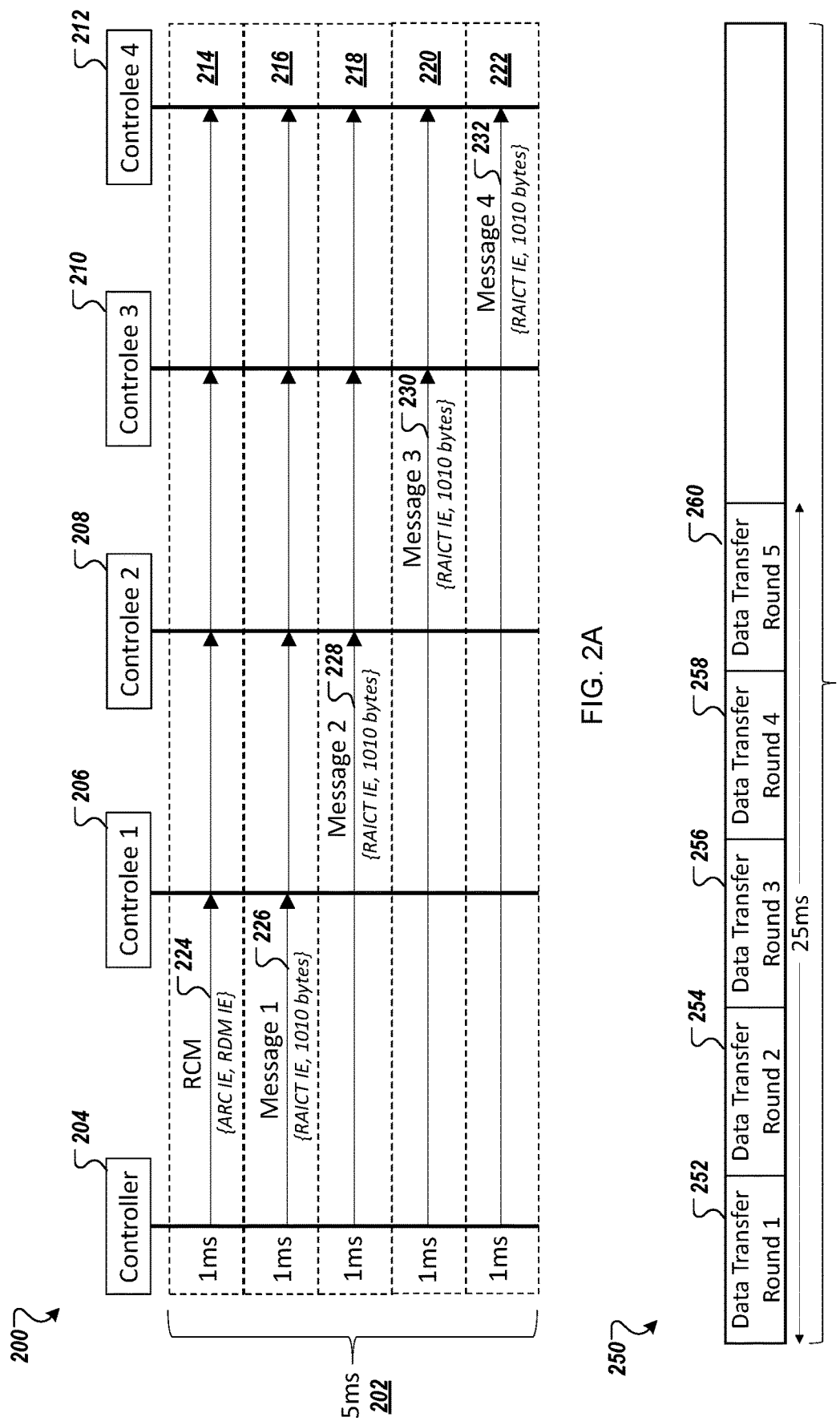
FIG. 2A is a sequence diagram illustrating a data round in a UWB data transfer protocol, according to at least one embodiment.
FIG. 2B is a sequence diagram illustrating a data block with multiple rounds in a UWB data transfer protocol, according to at least one embodiment.
Figure 3:
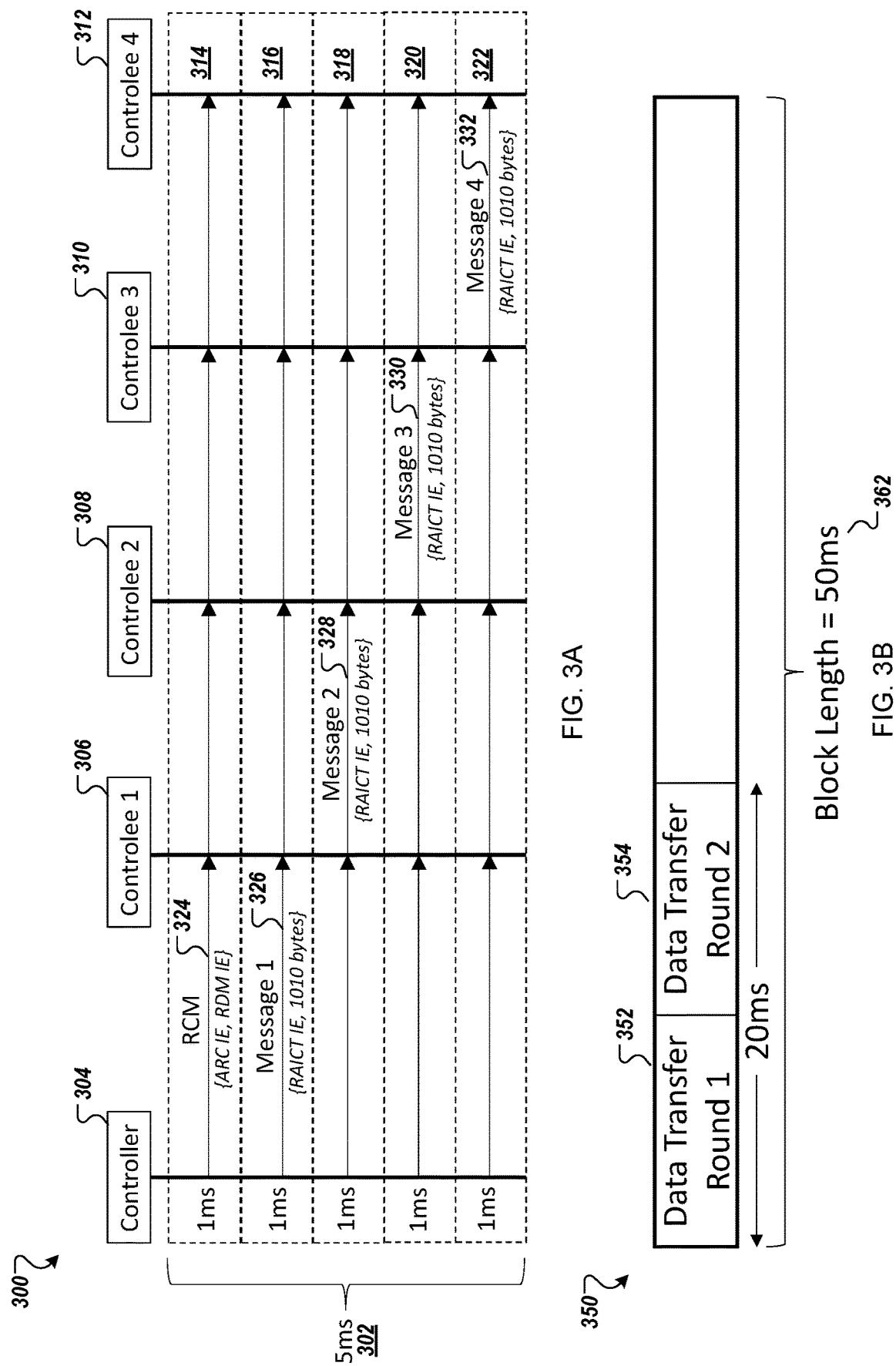
FIG. 3A is a sequence diagram illustrating a data round in a UWB data transfer protocol, according to at least one embodiment.
FIG. 3B is a sequence diagram illustrating a data block with multiple rounds in a UWB data transfer protocol, according to at least one embodiment.

FIG. 1 is a network diagram of a wireless network 100 with a first wireless device 102 with an ultra-wideband (UWB) radio 106 with media access control (MAC) circuitry for data transfers to a second wireless device 104, according to at least one embodiment. In this embodiment, the first wireless device 102 and second wireless device 104 operate in the same channel. First wireless device 102 provides backhaul connectivity to wireless network 100, such as using a wired or wireless connection 122 to the Internet. For example, the first wireless device 102 can be connected to a gateway or a modem via wired or wireless connection 122. Alternatively, the first wireless device 102 can be a router or a gateway and can provide internet access to the second wireless device 104, a third wireless device 110, a fourth wireless device 114, and a fifth wireless device 118, described below. First wireless device 102 can provide an access point to wireless devices 104, 110, 114, 118, and other devices. The wireless devices 104, 110, 114, 118 can be endpoint devices, client devices, or stations (STAs). In at least one embodiment, the first wireless device 102 is a controller, and the wireless device 104, 110, 114, and 118 are controlees. In at least one embodiment, the first wireless device 102 fetches data, such as audio data, from the Internet and distributes the data (e.g., uncompressed audio) over the air to the four devices 104, 110, 114, 118. In other embodiments, the first wireless device 102 communicates with more or fewer devices than four.

For example, the four devices can each include a speaker and play the audio data. For example, the data can be audio data of 48K samples/second at 16 bits, which totals 768 kbps. The total bandwidth to distribute the audio over the air to the four speakers would use 3.072 Mbps for transmitting the 768 kpbs to four speakers. The controller can fetch the audio data from a cloud service and distribute the uncompressed audio to the four speakers. The controller can send compressed data, but the compressed data may not meet latency requirements to be streamed in real-time due to latency issues. In at least one embodiment, the first wireless device 102 is a camera device, such as a doorbell device. The camera device can transfer data to other wireless devices in a wireless network. A camera device can capture video and audio. For example, the camera device can detect a motion event and alert the other devices quickly without going through a cloud service. In another example, one of the other devices can detect an event and report the event to the controller, and the controller can notify all controlees of the detected event. In other embodiments, one or more wireless devices 102, 104, 110, 114, and 118 can be a computer, a smart phone, a voice-controlled device, a wireless display, a wireless speaker, a game console, a wireless game pad, or the like.

In at least one embodiment, the first wireless device 102 includes a host processor 124 and a UWB radio 106. The UWB radio 106 includes a MAC circuitry that includes a data transfer mode to send data to one or more wireless devices using a UWB data transfer protocol. The host processor 124 can execute an application 126, such as an audio application. The application 126 can retrieve first data (e.g., audio data) from the Internet via wired or wireless connection 122. As described in more detail below, the MAC circuitry can receive the first data from the application 126 and send the first data to one or more of the wireless devices 104, 110, 114, and 118. For example, MAC circuitry generates and sends a first ranging control message (RCM) to the second wireless device 104, the third wireless device 110, the fourth wireless device 114, and the fifth wireless device 118 using the UWB radio 106. In at least one embodiment, the first RCM is sent as a broadcast frame or a multicast frame. The second wireless device 104 includes a UWB radio 108 that receives the first RCM. The first RCM includes information that defines how the first wireless device 102 is scheduled to send the data to one or more other wireless devices. The first wireless device 102 sends data in a data block. A data block is a time period for data transfer and includes a whole number of data rounds, where a data round is a period of sufficient duration to complete one transfer cycle to at least one of the wireless devices. Each data round is subdivided into an integer number of data slots where a data slot is a time period of sufficient duration for the transmission of at least one data frame. The slot duration and the number of slots make up a data round. These can be changed between data rounds using a subsequent RCM. For example, the first RCM includes: i) a first value that indicates a data transfer mode; ii) a second value that indicates a number of data rounds following the first RCM that are used to transfer the data; iii) a third value indicating a duration of a data block (i.e., a length of a data block) in which the number of data rounds occur; iv) a fourth value indicating a duration of each of the data rounds; v) a fifth value indicating a duration of a data slot within each of the data rounds; vi) a first slot index that identifies a first slot in which the second wireless device is scheduled to receive the audio data and a second slot index that identifies a second slot in which the third wireless device is scheduled to receive the audio data; and vii) an address of each of the other wireless devices. The data block is a time period for data transfer. Each data block contains a set of data rounds, where a data round is a period of sufficient duration to complete one transfer of data. Each data round is further subdivided into an integer number of data slots where a data slot is a time period of sufficient duration for the transmission of at least a frame or a portion of a frame. Similarly, the third wireless device 110, the fourth wireless device 114, and the fifth wireless device 118 include UWB radios and receives the first RCM. The first RCM can be used by the other wireless devices to determine when the first wireless device 102 is sending data to the respective wireless device.

After sending the first RCM, the MAC circuitry generates and sends, during a first slot, the first message to the second wireless device 104 and generates and sends, during a second slot, a second message to the third wireless device 110. The first message includes a first copy of the audio data or at least a portion of the audio data. For example, each message can have data corresponding to all audio channels (e.g., Left, Right, Center, etc.). Alternatively, each message can have only data for the respective audio channel. The second message includes a second copy of the audio data or at least a portion of the audio data. In at least one embodiment, the application 126 is an audio application. In other embodiments, the application 126 can be other types of applications that distribute data to other wireless devices using the UWB data transfer protocol described herein.

As described herein, the current standards for UWB (e.g., FiRa-UWB/IEEE 802.15.4z standard MAC protocol) are not directed to maximizing the throughput of data transfers between wireless devices. The MAC circuitry of the UWB radio 106 provides UWB data transfer protocol that improves throughput, addresses medium access, fair use of the channel for spectrum co-existence of multiple devices, given the data frames are longer than the ranging frames. The MAC circuitry of the UWB radio 106 can implement a UWB data transfer MAC protocol for intelligent audio systems, such as implemented on EFDs. In other embodiments, the MAC circuitry of the UWB radio 106 implements a UWB data transfer MAC protocol for any UWB data transfer for any other type of application. The MAC circuitry of the UWB radio 106 can include a channel hopping mechanism using host processor session control for ensuring fair channel usage and spectrum co-existence. The MAC circuitry of the UWB radio 106 can include a distance-based power control mechanism for data transfer protocol to ensure fair channel usage and spectrum co-existence In at least one embodiment, the first wireless device 102 includes a second radio 128, such as a PAN radio (e.g., BLE or Bluetooth® classic technology). The second radio 128 can be used to communicate information between the first wireless device 102 and the other wireless devices 104, 110, 114, 118. For example, the second radio 128 can be used for acknowledgments (ACKs) or the like. The second radio 128 is coupled to the host processor 124. The host processor 124 can establish a first wireless connection 130 with the second wireless device 104 using the second radio 128 and a second wireless connection 132 with the third wireless device 110 using the second radio 128. The first wireless connection 130 is a different from a third wireless connection 134 between the first wireless device 102 and the second wireless device 104 when the UWB radio 128 is being used.

Similarly, the second wireless connection 132 is a different from a fourth wireless connection 136 between the first wireless device 102 and the third wireless device 110 when the UWB radio is being used. The first wireless connection 130 can be used by the second wireless device 104 to send ACKs of messages received from the first wireless device 102 or to send and receive other information. The second wireless connection 132 can be used by the third wireless device 110 to send ACKs of messages received from the first wireless device 102, or send and receive other information. For example, the host processor 124 receives, from the second wireless device 104 via the second radio 128, a first ACK in response to the second wireless device 104 receiving a first RCM from the first wireless device 102. The host processor 124 receives, from the third wireless device 110 via the second radio 128, a second ACK in response to receiving the first RCM from the first wireless device 102. The host processor 124 can also receive, from the second wireless device 104 via the second radio 128, a third ACK in response to a first message received by the second wireless device 104. The host processor 124 can also receive, from the third wireless device via the second radio 128, a fourth ACK in response to a second message received by the third wireless device 110. The ACKs sent either from the first wireless connection or the second wireless connection can be used to manage link performance, like power control, retransmissions, modulation, coding, and other parameters.

In at least one embodiment, the host processor 124 initiates multiple sessions to send data to the other wireless devices. For example, the host processor 124 can initiate a first session and a second session. The MAC circuitry of the UWB radio 106 generates and sends, during a first data round, a first message to the second wireless device 104 on a first wireless channel during the first session and generates and sends, during a second slot, a second message to the third wireless device 110 on a second wireless channel during the second session. In a further embodiment, the MAC circuitry generates and sends, during a third slot, a third message to the fourth wireless device 114 on the first wireless channel during the first session. The third message can include a third copy of the audio data or a portion of the audio data. Similarly, the MAC circuitry can generate and send, during a fourth slot, a fourth message to the fifth wireless device 118 on the second wireless channel during the second session. Prior to sending the third message and/or the fourth message, the MAC circuitry can generate and send a third RCM to the fourth wireless device 114 and a fourth RCM to the fifth wireless device 118. Examples of the UWB data transfer protocol are described below with respect to FIGS. 2A-3B.

FIG. 2A is a sequence diagram 200 illustrating a data round 202 in a UWB data transfer protocol, according to at least one embodiment. The sequence diagram 200 shows a single data round for a controller 204 to send data to four controlees 206-212. As described above, a data block is a time period for data transfer. Each data block contains a set of data rounds, where a data round is a period of sufficient duration to complete one transfer of data. Each data round is further subdivided into an integer number of data slots where a data slot is a time period of sufficient duration for the transmission of at least a frame or a portion of a frame. In FIGS. 2A-2B, a data block 250 is divided into 5 data rounds, each including 5 data slots. The slot duration and the number of slots that make up a data round can be changed between data rounds. This can be achieved by the controller 204 sending an RCM with the modified data round configuration whenever a change is required.

Figure 4:
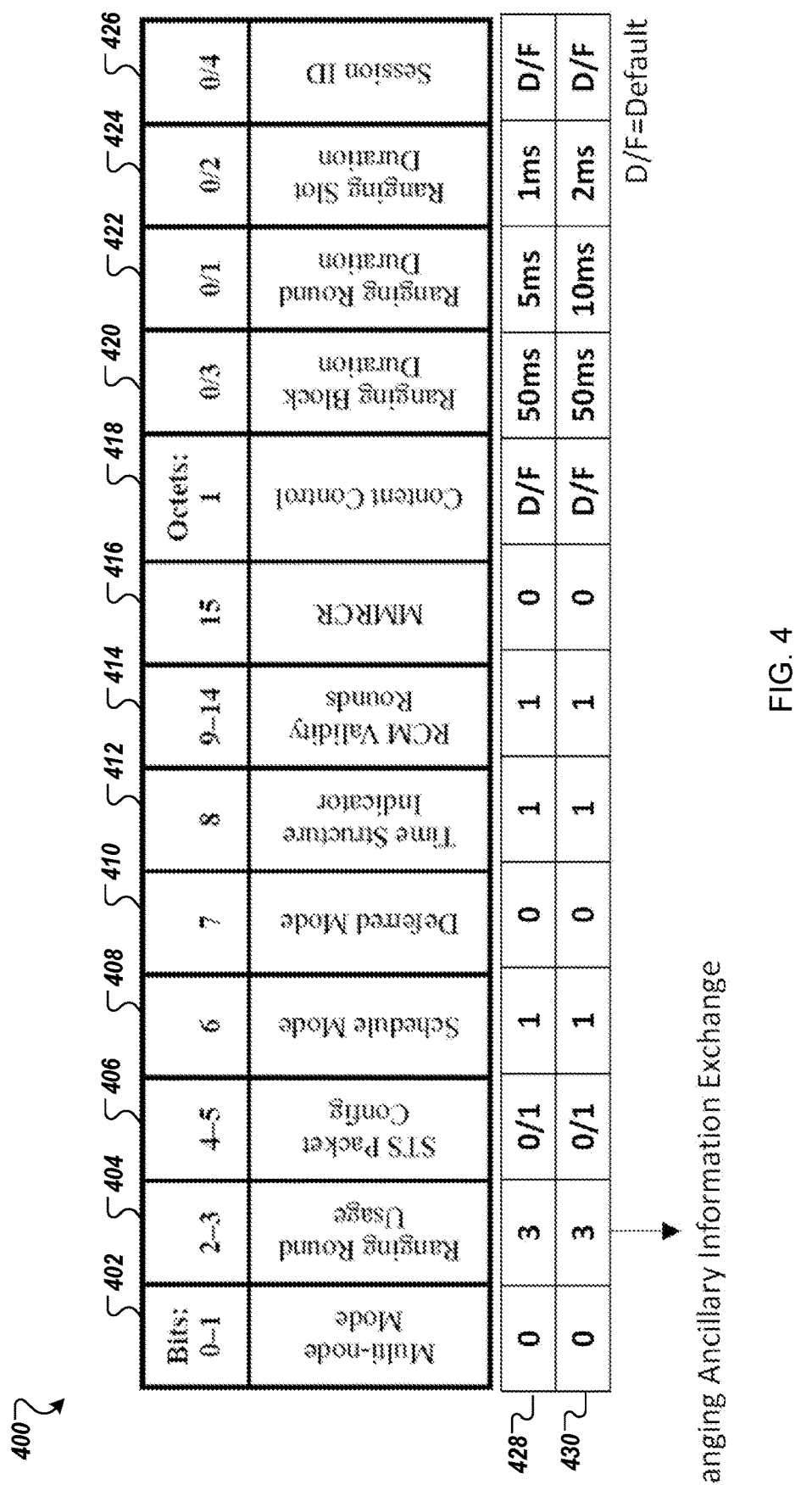
FIG. 4 is an example frame element that includes data transfer information, according to at least one embodiment.
Figure 5:
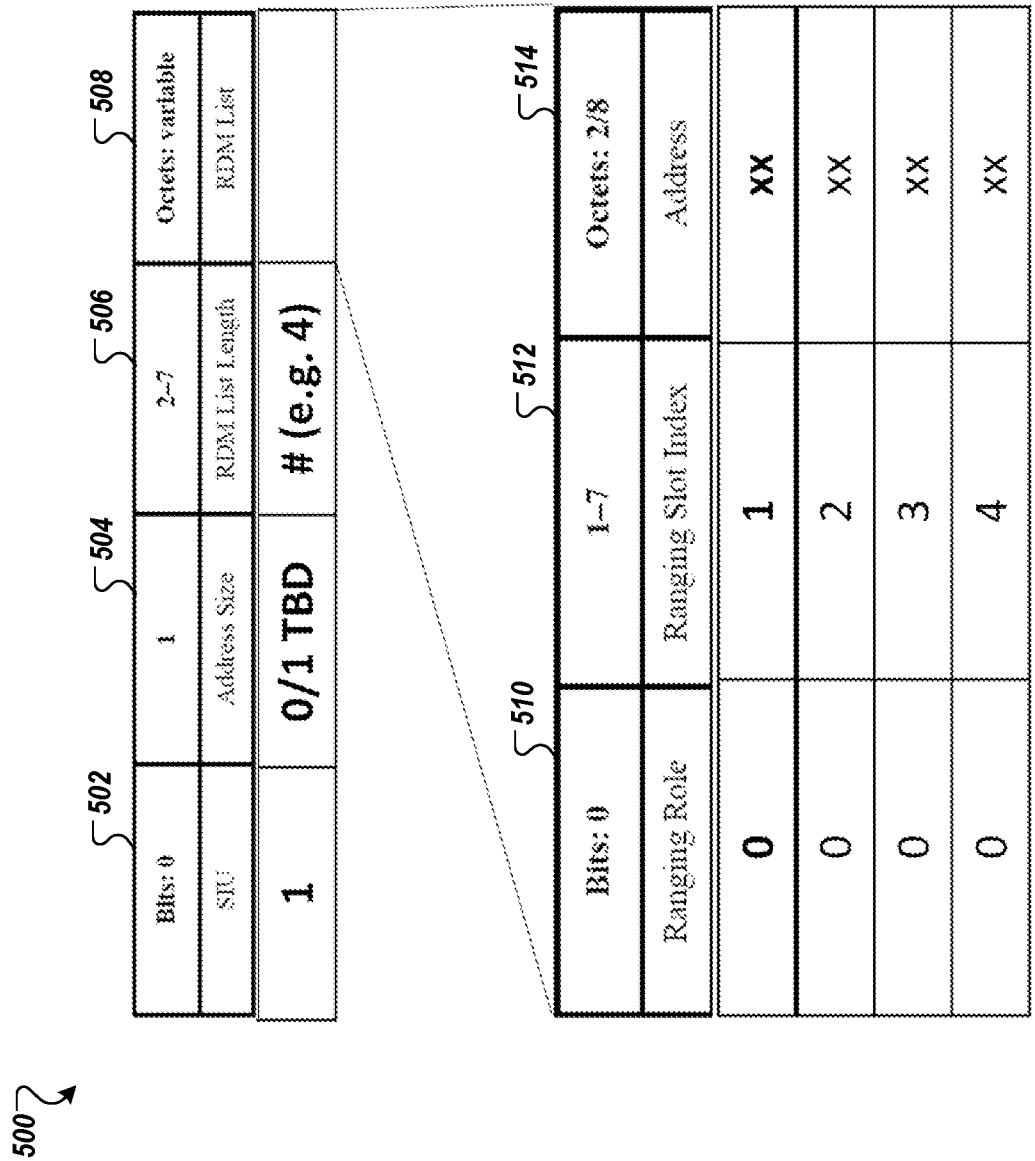
FIG. 5 is an example frame element that includes slot assignment information, according to at least one embodiment.

During a first slot 214 of the data round 202, the controller 204 sends a control message 224 to a first controlee 206, a second controlee 208, a third controlee 210, and a fourth controlee 212. The control message 224 can be sent as a unicast frame, a multi-case frame, or a broadcast frame. As illustrated in FIG. 2A, the control message 224 is a broadcast or a multi-cast frame sent in a first slot 214 of the data round 202. In at least one embodiment, the control message 224 can include an Advanced Ranging Control Information Element (ARC IE), such as illustrated in FIG. 4, and a Ranging Device Management Information Element (RDM IE), such as illustrated in FIG. 5. The ARC IE includes at least information that indicates a data transfer mode (as opposed to a ranging mode), a number of data rounds in a data block, a duration of the data block, a duration of each data round, and a duration of a data slot within each data round. The RDM IE includes information that indicates a number of slot indices and devices assigned to the respective one of the slot indices. For example, the RDM IE can include a ranging slot index and an address for each of the four controlees 206-212. It should be noted that the control message 224 can be other formats. The four controlees 206-212 receive the control message 224 and use the information to determine when the controller 204 communicates data to the respective controlee. For example, the first controlee 206 can determine that it is assigned a first slot index and can listen for data sent during a first slot of a data round, as well as the block length, slot duration, a number of data rounds, and a number of slots per data round. In at least one embodiment, the control message 224 indicates that one data round is 5 milliseconds (ms), each slot is 1 ms, there are 1010 bytes (8080 bits) of data per slot with an approximate airtime of 380 microseconds (µs), and there are five rounds with four rounds of data totaling 4040 bytes (32 kbits) data per round (5 ms). If there are additional controlees, then additional slots can be added to the data round, or other adjustments could be made to accommodate the additional controlees. If there are fewer controlees, the number of slots can be adjusted as well. In at least one embodiment, each of the controlees 206-212 can acknowledge the receipt of messages by sending ACKs via an out-of-band (OOB) channel. In another embodiment, the ACKs can be sent via the UWB channel. It should be noted that in other embodiments, the same information can be conveyed in another format than ARC IE, RDM IE, or the like. For example, the same information can be conveyed in a different format for FiRa. This applies to all IEs described herein.

For example, the ACKs can be sent in a higher-layer implementation. In at least one embodiment, the OOB channel is implemented using a different radio technology than UWB, such as PAN. In at least one embodiment, the controlee can send ACKs via an established BLE connection between the controlee and the controller.

Figure 6:
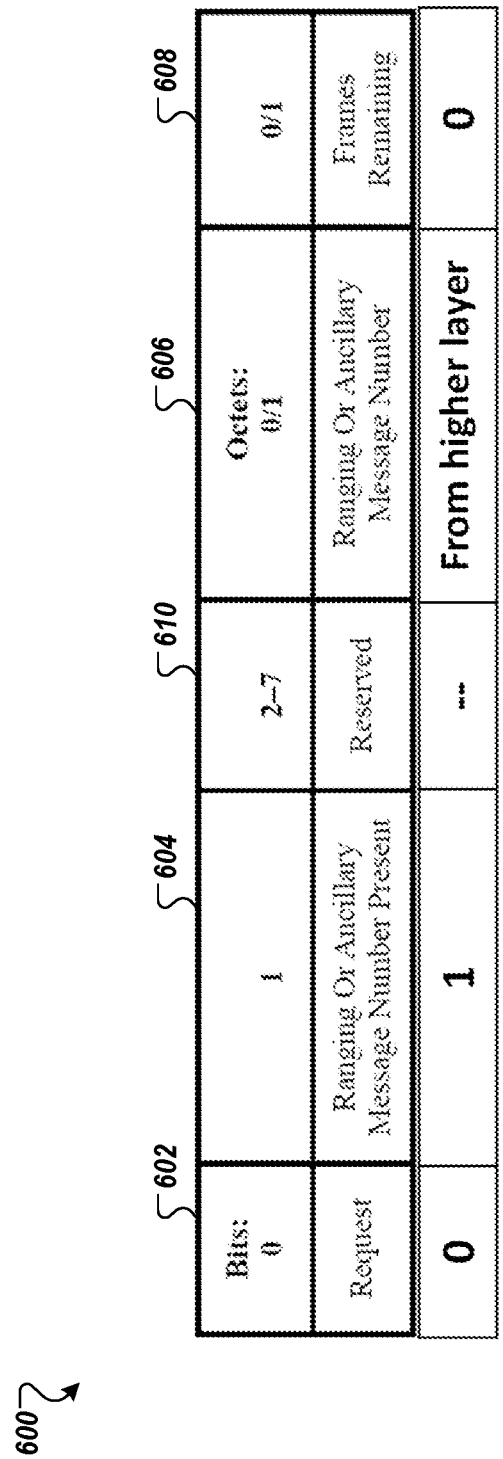
FIG. 6 is an example frame element that includes header information about a data transfer, according to at least one embodiment.

During a second slot 216 of the data round 202, the controller 204 sends a first message 226. The first message 226 can be sent as a unicast frame, a multi-case frame, or a broadcast frame. In at least one embodiment, the first message 226 can include a Ranging Ancillary Information Message Counter and Type Information Element (RAICT IE), such as illustrated in FIG. 6, and a first copy of data (e.g., 1010 bytes). In another embodiment, the first message 226 includes a portion of the data relevant to the first controlee 206. The first controlee 206 receives the first message 226 and performs one or more operations using the first copy of the data (or the relevant portion of the data).

During a third slot 218 of the data round 202, the controller 204 sends a second message 228. The second message 228 can be sent as a unicast frame, a multi-case frame, or a broadcast frame. In at least one embodiment, the second message 228 can include RAICT IE and a second copy of data (e.g., 1010 bytes). In another embodiment, the second message 228 includes a portion of the data relevant to the second controlee 208. The second controlee 208 receives the second message 228 and performs one or more operations using the second copy of the data (or the relevant portion of the data).

During a fourth slot 220 of the data round 202, the controller 204 sends a third message 230. The third message 230 can be sent as a unicast frame, a multi-case frame, or a broadcast frame. In at least one embodiment, the third message 230 can include RAICT IE and a third copy of data (e.g., 1010 bytes). In another embodiment, the third message 230 includes a portion of the data relevant to the third controlee 210. The third controlee 210 receives the third message 230 and performs one or more operations using the third copy of the data (or the relevant portion of the data).

During a fifth slot 222 of the data round 202, the controller 204 sends a fourth message 232. The fourth message 232 can be sent as a unicast frame, a multi-case frame, or a broadcast frame. In at least one embodiment, the fourth message 232 can include RAICT IE and a first copy of data (e.g., 1010 bytes). In another embodiment, the fourth message 232 includes a portion of the data relevant to the fourth controlee 212. The fourth controlee 212 receives the fourth message 232 and performs one or more operations using the fourth copy of the data (or the relevant portion of the data).

In order to achieve a specified data rate, such as 3.232 Mbps, the controller 204 can send multiple rounds in a data block, such as 5 data rounds of 5 ms per block (25 ms per data round). In this example, the resulting data transfer per block would be 161.6 kbps in 50 ms (e.g., 32 kb×5), achieving a data rate of 3.232 Mbps. In at least one embodiment, the rounds of a data block are back to back. In at least one embodiment, the rounds of a data block are spaced out. An actual airtime in the 50 ms block is 9.5 ms or 19% channel occupancy (e.g., 380 µs×5 slots×5 rounds). An example of a data block is illustrated in FIG. 2B.

FIG. 2B is a sequence diagram illustrating a data block 250 with multiple data rounds 252-260 in a UWB data transfer protocol, according to at least one embodiment. In this example, the data block 250 has a block length 262 of 50 ms, in which 25 ms is the five data transfer rounds 252-260.

FIG. 3A is a sequence diagram 300 illustrating a data round 302 in a UWB data transfer protocol, according to at least one embodiment. The sequence diagram 300 shows a single data round 302 for a controller 304 to send data to four controlees 306-312. As described above, a data block is a time period for data transfer. Each data block contains a set of data rounds, where a data round is a period of sufficient duration to complete one transfer of data. Each data round is further subdivided into an integer number of data slots where a data slot is a time period of sufficient duration for the transmission of at least a frame or a portion of a frame. In FIGS. 3A-3B, a data block 350 is divided into 2 data rounds, each including 5 data slots. The slot duration and the number of slots that make up a data round can be changed between data rounds. This can be achieved by the controller 304 sending an RCM with the modified data round configuration whenever a change is required.

During a first slot 314 of the data round 302, the controller 304 sends a control message 324 to a first controlee 306, a second controlee 308, a third controlee 310, and a fourth controlee 312. The control message 324 can be sent as a unicast frame, a multi-case frame, or a broadcast frame. As illustrated in FIG. 3A, the control message 324 is a broadcast or a multi-cast frame sent in a first slot 314 of the data round 302. In at least one embodiment, the control message 324 can include an ARC IE, such as illustrated in FIG. 4, and an RDM IE, such as illustrated in FIG. 5. The ARC IE includes at least information that indicates a data transfer mode (as opposed to a ranging mode), a number of data rounds in a data block, a duration of the data block, a duration of each data round, and a duration of a data slot within each data round. The RDM IE includes information that indicates a number of slot indices and devices assigned to the respective one of the slot indices. For example, the RDM IE can include a ranging slot index and an address for each of the four controlees 306-312. The four controlees 306-312 receive the control message 324 and use the information to determine when the controller 304 communicates data to the respective controlee. For example, the first controlee 306 can determine that it is assigned a first slot index and can listen for data sent during a first slot of a data round, as well as the block length, slot duration, a number of data rounds, and a number of slots per data round. In at least one embodiment, the control message 324 indicates that one data round is 10 ms, each slot is 2 ms, there is 3 kbytes (24 k bits) of data per slot with an approximate airtime of 900 µs, and there are five rounds with four rounds of data totaling 12 kbytes (96 kbits) data per round (10 ms). If there are additional controlees, then additional slots can be added to the data round, or other adjustments could be made to accommodate the additional controlees. If there are fewer controlees, the number of slots can be adjusted as well. In at least one embodiment, each of the controlees 306-312 can acknowledge the receipt of messages by sending ACKs via an OOB channel. For example, the ACKs can be sent in a higher layer implementation. In at least one embodiment, the OOB channel is implemented using a different radio technology than UWB, such as PAN. In at least one embodiment, the controlee can send ACKs via an established BLE connection between the controlee and the controller.

During a second slot 316 of the data round 302, the controller 304 sends a first message 326. As illustrated in FIG. 3A, the first message 326 can be sent as a unicast frame. Alternatively, the first message 326 can be sent as a multi-case frame or a broadcast frame. In at least one embodiment, the first message 326 can include a RAICT IE, such as illustrated in FIG. 6, and a first copy of data (e.g., 3 kbytes). In another embodiment, the first message 326 includes a portion of the data relevant to the first controlee 306. The first controlee 306 receives the first message 326 and performs one or more operations using the first copy of the data (or the relevant portion of the data).

During a third slot 318 of the data round 302, the controller 304 sends a second message 328. As illustrated in FIG. 3A, the second message 328 can be sent as a unicast frame. Alternatively, the second message 328 can be sent as a multi-case frame or a broadcast frame. In at least one embodiment, the second message 328 can include RAICT IE and a second copy of data (e.g., 3 kbytes). In another embodiment, the second message 328 includes a portion of the data relevant to the second controlee 308. The second controlee 308 receives the second message 328 and performs one or more operations using the second copy of the data (or the relevant portion of the data).

During a fourth slot 320 of the data round 302, the controller 304 sends a third message 330. As illustrated in FIG. 3A, the third message 330 can be sent as a unicast frame. Alternatively, the third message 330 can be sent as a multi-case frame or a broadcast frame. In at least one embodiment, the third message 330 can include RAICT IE and a third copy of data (e.g., 3 kbytes). In another embodiment, the third message 330 includes a portion of the data relevant to the third controlee 310. The third controlee 310 receives the third message 330 and performs one or more operations using the third copy of the data (or the relevant portion of the data).

During a fifth slot 322 of the data round 302, the controller 304 sends a fourth message 332. As illustrated in FIG. 3A, the fourth message 332 can be sent as a unicast frame. Alternatively, the fourth message 332 can be sent as a multi-case frame or a broadcast frame. In at least one embodiment, the fourth message 332 can include RAICT IE and a first copy of data (e.g., 3 kbytes). In another embodiment, the fourth message 332 includes a portion of the data relevant to the fourth controlee 312. The fourth controlee 312 receives the fourth message 332 and performs one or more operations using the fourth copy of the data (or the relevant portion of the data).

In order to achieve a specified data rate, such as 3.84 Mbps, the controller 304 can send multiple rounds in a data block, such as 2 data rounds of 20 ms per block (10 ms per data round). In this example, the resulting data transfer per block would be 192 kbps in 50 ms (e.g., 96 kb×2), achieving a data rate of 3.84 Mbps. In at least one embodiment, the rounds of a data block are back to back. In at least one embodiment, the rounds of a data block are spaced out. An actual airtime in the 50 ms block is 8.5 ms or less than 17% channel occupancy (e.g., (1 ms×4 slots×2 rounds)+(~500 ms for RCM)=8.5 ms). An example of a data block is illustrated in FIG. 3B.

FIG. 3B is a sequence diagram illustrating a data block 350 with multiple rounds 352-354 in a UWB data transfer protocol, according to at least one embodiment. In this example, the data block 350 has a block length 362 of 50 ms, in which 20 ms is the two data transfer rounds 352-354.

FIG. 4 is an example frame element 400 that includes data transfer information, according to at least one embodiment. In at least one embodiment, the frame element 400 is an Advanced Ranging Control Information Element (ARC IE), and the various fields of the ARC IE are used for configuring parameters for data transfers, instead of ranging parameters for ranging. In the ranging mode, the ARC IE can be used to convey ranging parameters to control and configure aspects of the ranging procedures, such as the time-slot structure, the ranging methods, and the packet configuration. In a data transfer mode, the ARC IE can be used to convey parameters to control and configure aspects of the data transfer procedures, such as the time-slot structure. In another embodiment, the frame element 400 includes similar fields as the ARC IE element. In at least one embodiment, the frame element 400 includes various fields, including: a multi-node mode field 402, a round usage field 404, a packet configuration field 406, a schedule mode field 408, a deferred mode filed 410, a time structure indicator field 412, an RCM validity rounds field 414, a Multiple Message Receipt Confirmation Request (MMRCR) field 416, a content control field 418, a block duration field 420, a round duration field 422, a slot duration field 424, and a session identifier (ID) field 426.

In at least one embodiment, a value in the multi-node mode field 402 specifies whether the ranging or data transfer is to be performed between a single pair of devices or is multi-node ranging or data transfer involving many devices. The multi-node mode field 401 can have a first value to specify a single device to a single device (unicast), a second value to specify a multi-node one-to-many (multi-cast or broadcast), or a third value to specify multi-node many-to-many (multicast). A fourth value can be reserved for an additional mode. A value in the round usage field 404 specifies the use of the current round and a subsequent number of round(s) following the RCM as specified in the Validity Rounds field 414. The Packet configuration field 406 specifies the packet format to be used in the round(s) that follow the ARC IE. A value in the schedule mode field 408 specifies whether the scheduling-based ranging, a contention-based ranging, or a data transfer is being performed. A value in the deferred mode field 410 specifies whether or not the deferred frame is allowed for the measurement report in a ranging mode. If the field value is one, it indicates that ranging slots are scheduled for the exchange of deferred data frame(s) after the ranging cycle, which should typically be used to report certain measurement information, for example, time of flight (TOF), reply time, and angle of arrival (AOA). If the field value is zero, it indicates that ranging slots are not scheduled for data frames for the exchange of requested information, and the requested information should be embedded in a response frame (RFRAME). A value in the time structure Indicator field 412 specifies the time structure behavior in the following rounds (e.g., interval-based or block-based). A value in the RCM validity rounds field 414 is an unsigned integer that specifies the number of consecutive rounds controlled by the RCM. It should be noted that this value cannot be larger than the number of remaining rounds in the current block. A value in the MMRCR field 416 indicates whether multiple message receipt confirmation is requested or not: if the MMRCR field value is one, it is requested, otherwise it is not, for example. A value in the content control field 418 indicates the presence or not of other fields in the ARC IE, such as the block duration field 420, a round duration field 422, a slot duration field 424, and session ID field 426. A value in the block duration field 420 is an unsigned integer that specifies the duration of a data block in the standard transmission unit. A value in the round duration field 422 is an unsigned integer that specifies the duration of the round in units of slots, which is the number of slots in the round. A value in the slot duration field 424 is an unsigned integer that specifies the duration of a slot in a standard transmission unit. A data session can be configured, and a value in the session ID field 426 contains a session identifier (e.g., a 4-octet session ID) that is unique to a session assigned by the controller. In at least one embodiment, if there is no change to the timing information, the one or more fields (e.g., 420-424) can be omitted from the frame element 400 until there is a change.

FIG. 4 also illustrates example values 428 in the various fields corresponding to the data round 202 of FIG. 2A and example values 430 in the various fields corresponding to the data round 302 of FIG. 3A.

FIG. 5 is an example frame element 500 that includes slot assignment information, according to at least one embodiment. In at least one embodiment, the frame element 500 is a Ranging Device Management Information Element (RDM IE), and the controller uses the various fields of the RDM IE to control the devices participating in a set of data rounds when the controller knows the device identities. In another embodiment, the frame element 500 includes similar fields as the RDM IE element. In at least one embodiment, the frame element 500 includes various fields, including: a slot index used (SIU) field 502, an address size field 504, an RDM list length field 506, and an RDM list field 508. In at least one embodiment, a value in the SIU field 502 indicates whether the slot index field of the RDM list element is used (e.g., when the SIU field is one, it is used, and when the SIU field is zero, it is not used). When the SIU filed 502 is one in a ranging mode, the RDM IE element can be used to allocate time slots and assigning ranging roles of controlees for the scheduling-based ranging. When the SIU filed 502 is one in a data transfer mode, the RDM IE element can be used to allocate time slots of controlees.

A value in the address size field 504 species the size of the addresses used in the RDM list field 508. For example, if the address size field is zero, all addresses in the RDM List elements are short addresses, and if the address size field is one, all addresses are extended addresses. A value in the RDM list length field 506 indicates the number of elements in the RDM List field 508. This corresponds to the number of participating controlees by the RDM IE. The elements in the RDM list field 508 can be formatted as illustrated in FIG. 5 with a role field 510, a slot index field 512, and an address field 514. The Role field specifies whether the selected device is to be an initiator or a responder. When the Role field has a value of zero, the selected device is a responder. When the Role field has a value of one, the selected device is an initiator. The slot index field 512 is used (when the SIU field is one) to assign a slot index to the device identified by the address field 514. When the SIU field is zero, this field is unused/reserved. The address field 514 identifies each participating device. The size of the address field 514 is specified by the address size field 504 of the RDM IE. A network of mixed address size devices can be catered for by using two RDM IEs, one for the short address devices and the other for the extended address devices. In at least one embodiment, the RDM IE can be used by the controller to exchange scheduling information among the controlees for a set of data rounds specified by the same RCM. Upon reception of the RCM, a controlee knows whether it is selected to participate in the data round(s).

FIG. 6 is an example frame element 600 that includes header information about a data transfer, according to at least one embodiment. In at least one embodiment, the frame element 600 is a Ranging Ancillary Information Message Counter and Type Information Element (RAICT IE), and the various fields of the RAICT IE are used by the controller to send data transfers to a selected set of devices and to control data transfer procedures. In another embodiment, the frame element 600 includes similar fields as the RAICT IE. In at least one embodiment, the frame element 600 includes various fields, including: a request field 602, an ancillary message number present field 604, an ancillary message number field 608, a frame remaining field 608, and an optional reserved field 610. In at least one embodiment, a value in the request field indicates that this IE is used to request the slots from the controller; otherwise, it can be set to zero. The ancillary message number present field 604 indicates, when storing a one, indicates that the ancillary message number field is present in the IE, or the field is not included, when storing a zero. The ancillary message number field 606 conveys the ancillary message number. The frames remaining field 608 conveys to the responder the number of frames remaining to complete the present data message exchange. In some cases, the frame remaining field 608 can be used to convey to the controller a request to schedule this number of slots for the next exchange.

Figure 7:
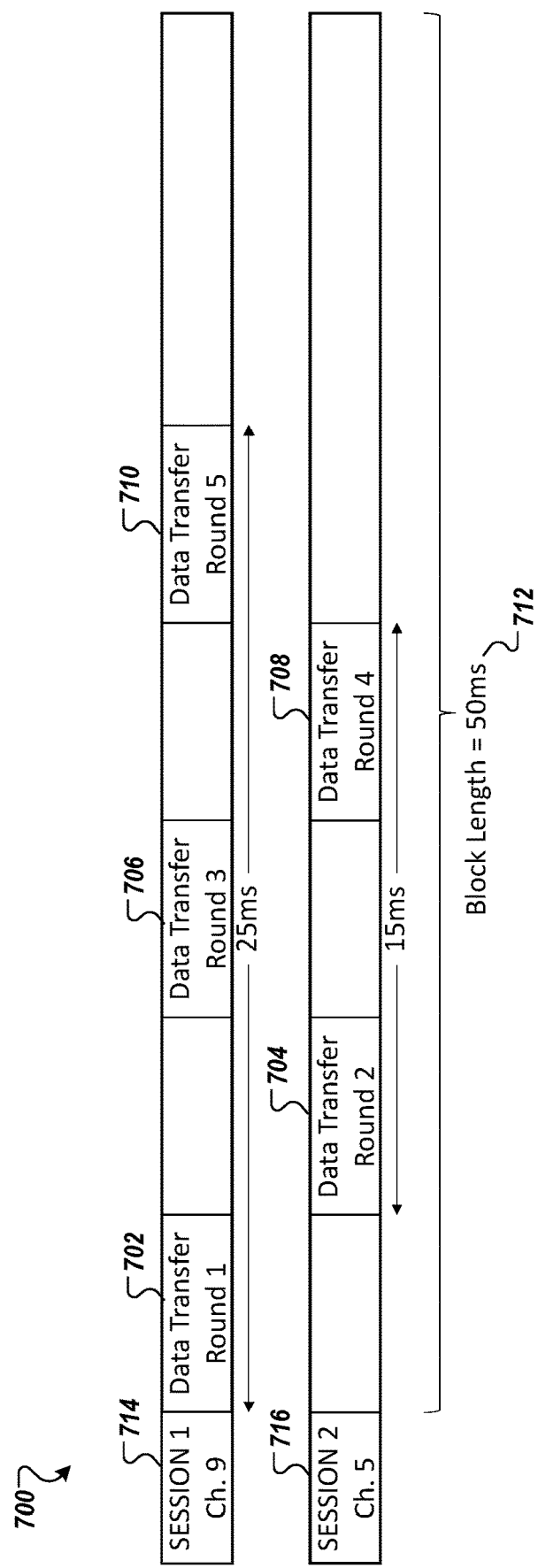
FIG. 7 is a sequence diagram illustrating a data block with multiple rounds with channel hopping in a UWB data transfer protocol, according to at least one embodiment.

FIG. 7 is a sequence diagram illustrating a data block 700 with multiple rounds with channel hopping in a UWB data transfer protocol, according to at least one embodiment. The block 700 is similar to the data block 250 of FIG. 2B with multiple data transfer rounds 702-710 and having a block length 712 of 50 ms in which 25 ms is the five data transfer rounds 702-710, except two channels are used for the multiple rounds. In particular, the controller performs a first data transfer round 702 on a first wireless channel (e.g., channel 9), then performs a second data transfer round 704 on a second wireless channel (e.g., channel 5). The controller then performs a third data transfer round 706 on the first wireless channel and a fourth data transfer round 708 on the second wireless channel. The controller then performs a fifth data transfer round 710 on the first wireless channel. In at least one embodiment, a host processor can initiate two sessions, including a first session 714 and a second session 716. The controller can perform the first data transfer round 702, the third data transfer round 706, and the fifth data transfer round 710 during the first session 714. The controller can perform the second data transfer round 704 and the fourth data transfer round 708 during the second session 716.

In at least one embodiment, channel hopping is managed by a host processor. In at least one embodiment, the host processor can initiate two parallel sessions. The UWB MAC circuitry can assign a first wireless channel (e.g., channel 9) to the first session 714 and a second wireless channel (e.g., channel 5) to the second session 716. The channel assignments can also be reversed. Using channel hopping, a data rate of 3.84 Mbps can be achieved in this example. The first wireless channel can have a channel occupancy of 11.4% (5.7 ms), and the second wireless channel can have a channel occupancy of 7.6% (3.8 ms).

Figure 8:
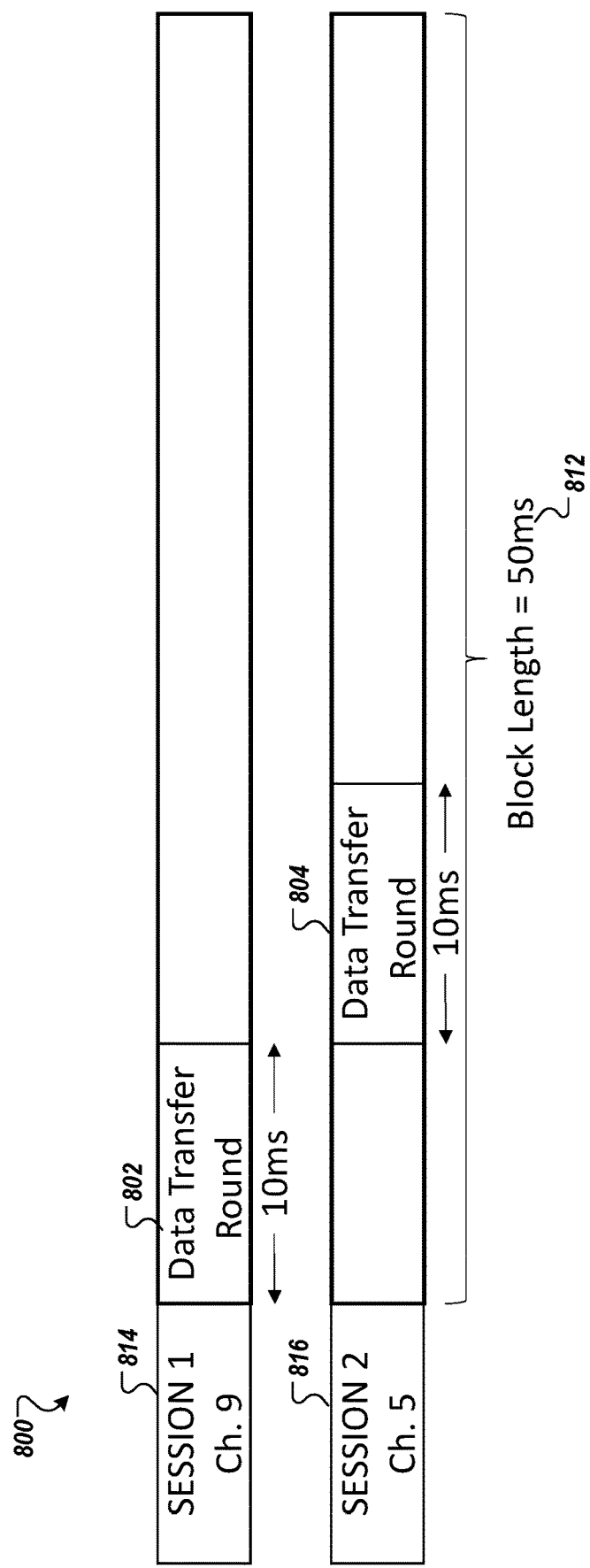
FIG. 8 is a sequence diagram illustrating a data block with multiple rounds with channel hopping in a UWB data transfer protocol, according to at least one embodiment.

FIG. 8 is a sequence diagram illustrating a data block 800 with multiple rounds with channel hopping in a UWB data transfer protocol, according to at least one embodiment. The data block 800 is similar to the data block 350 of FIG. 3B with multiple data transfer rounds 802-804 and having a block length 812 of 50 ms in which 20 ms is the two data transfer rounds 802-804, except two channels are used for the multiple rounds. In particular, the controller performs a first data transfer round 802 on a first wireless channel (e.g., channel 9), then performs a second data transfer round 804 on a second wireless channel (e.g., channel 5). In at least one embodiment, a host processor can initiate two sessions, including a first session 814 and a second session 816. The controller can perform the first data transfer round 802 during the first session 814. The controller can perform the second data transfer round 804 during the second session 816.

In at least one embodiment, channel hopping is managed by a host processor. In at least one embodiment, the host processor can initiate two parallel sessions. The UWB MAC circuitry can assign a first wireless channel (e.g., channel 9) to the first session 814 and a second wireless channel (e.g., channel 5) to the second session 816. The channel assignments can also be reversed. Using channel hopping, a data rate of 3.232 Mbps can be achieved in this example. The first wireless channel can have a channel occupancy of 8.5% (4.25 ms), and the second wireless channel can have a channel occupancy of 8.5% (4.25 ms).

Figure 9:
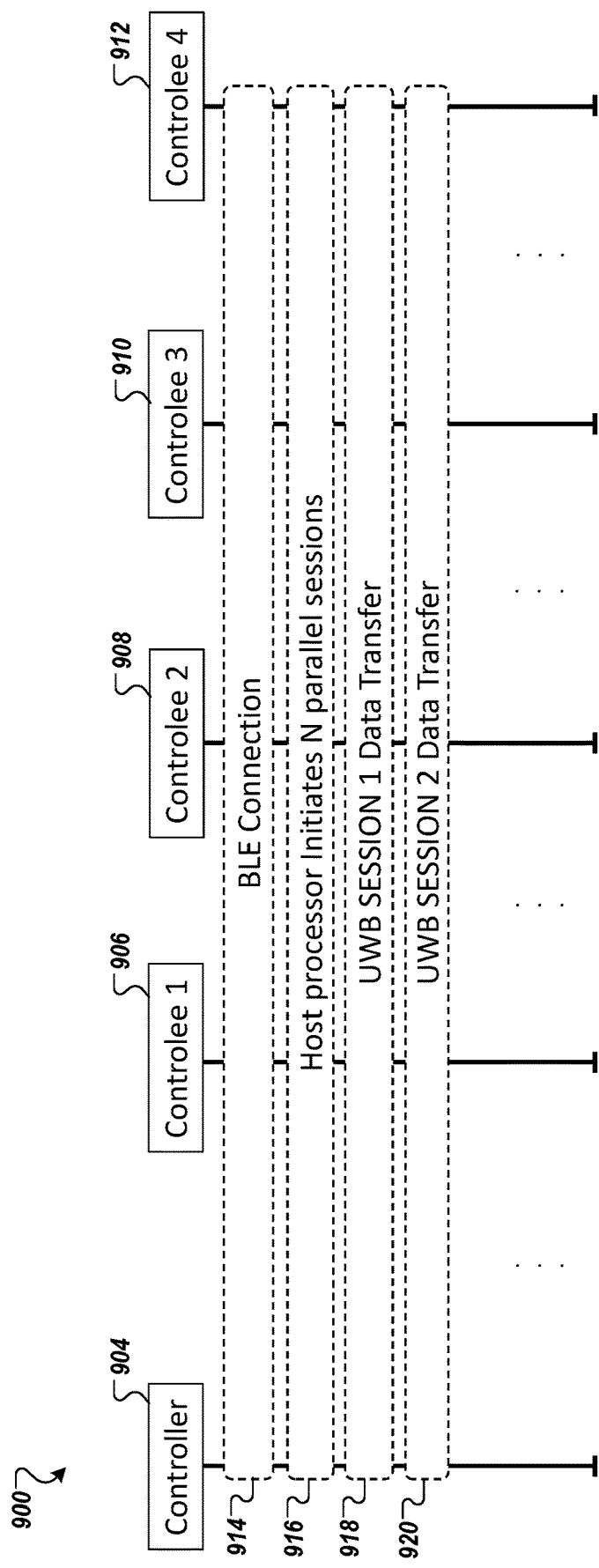
FIG. 9 is a sequence diagram for data transfers and co-existence, according to at least one embodiment.

FIG. 9 is a sequence diagram 900 for data transfers and co-existence, according to at least one embodiment. The sequence diagram 900 shows stages of data transfers between a controller 904 and four controlees 906-912. At a first stage 914, the controller 904 establishes a first wireless connection (e.g., BLE connection) with each of the controlees 906-912. This can help reduce the power consumption of the devices. The first wireless connection can be used for device discovery, exchanging information for slot assignments, or the like. In the embodiment that the controlees 906-912 are speakers, the first wireless connection can be used for assigning a speaker identifier (e.g., front left channel, front right channel, rear left channel, rear right channel). Alternatively, the speaker identifiers can be assigned based on ranging information from a ranging stage of the UWB radio. At a second stage 916, a host processor of controller 904 initiates a number of parallel sessions, N, where N is a positive integer greater than 1. At a third stage 918, the controller 904 can perform a first data transfer in a first session (UWB session 1 data transfer). At a fourth stage 920, the controller 904 can perform a second data transfer in a second session (UWB session 2 data transfer).

Figure 10:
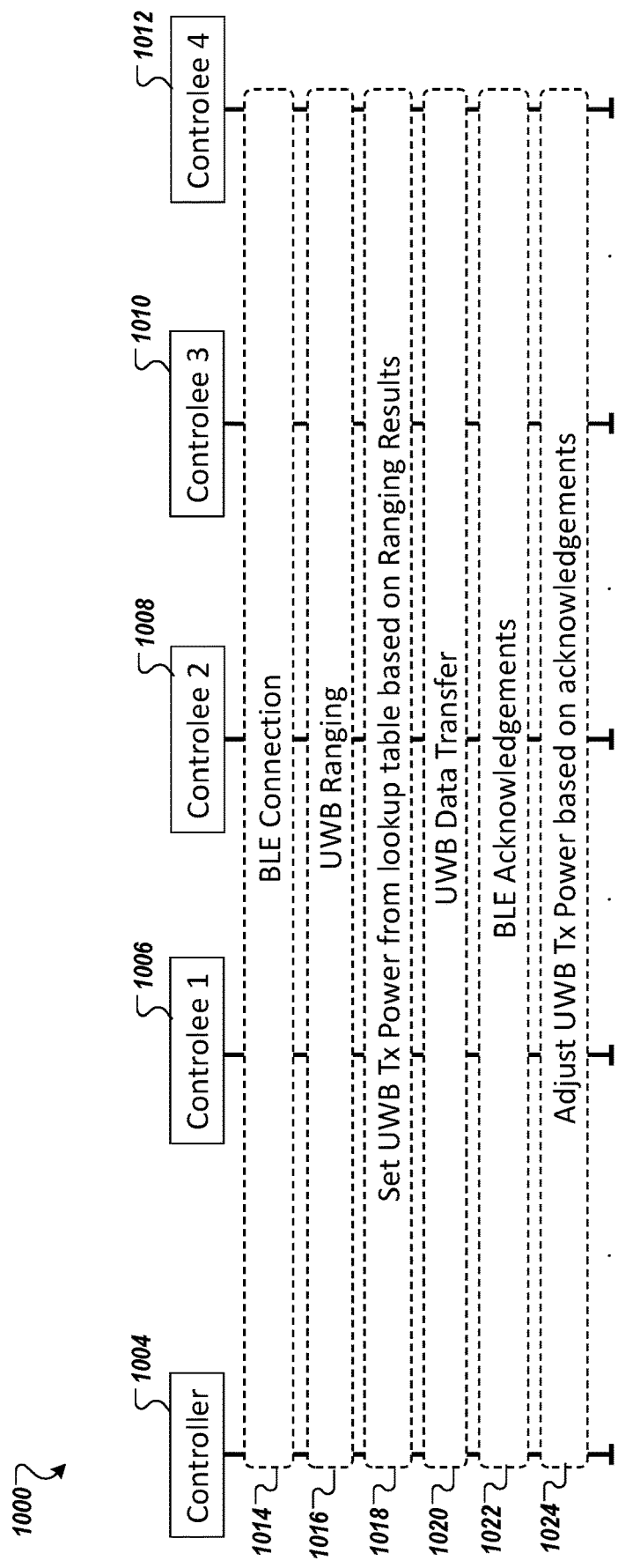
FIG. 10 is a sequence diagram for data transfers and co-existence using a distance-based power control mechanism, according to at least one embodiment.

FIG. 10 is a sequence diagram 1000 for data transfers and co-existence using a distance-based power control mechanism, according to at least one embodiment. The sequence diagram 1000 shows stages of data transfers between a controller 1004 and four controlees 1006-1012. At a first stage 1014, the controller 1004 establishes a first wireless connection (e.g., BLE connection) with each of the controlees 1006-1012. This can help reduce the power consumption of the devices. The first wireless connection can be used for device discovery, exchanging information for slot assignments, or the like. In the embodiment that the controlees 906-912 are speakers, the first wireless connection can be used for assigning a speaker identifier (e.g., front left channel, front right channel, rear left channel, rear right channel). Alternatively, the speaker identifiers can be assigned based on ranging information from a ranging stage of the UWB radio, such as illustrated in FIG. 10. At a second stage 1016, the controller 1004 performs UWB ranging with the four controlees 1006-1012. At a third stage 1018, the controller 1004 sets the transmit power level of UWB radio from a lookup table based on ranging results at the second stage 1016. At a fourth stage 1020, the controller 1004 performs UWB transfers as described herein. At a fifth stage 1022, acknowledgments to messages being sent by the controller 1004 can be sent by the controlees 1006-1012 over the first wireless connection (e.g., as BLE acknowledgments), instead of over the wireless connections used for the UWB transfers at the fourth stage 1020. It should be noted that the fifth stage 1022 can occur concurrently with the second stage 1016, and the fourth stage 1020. At a sixth stage 1024, the controller 10004 can adjust the transmit power of the UWB radio based on the acknowledgments received from the controlees 1006-1012.

In at least one embodiment, the controller 1004 can initiate multiple sessions for channel-hopping at the fourth stage 1020 as described herein. In at least one embodiment, the acknowledgments are sent via a BLE connection. In another embodiment, the acknowledgments are sent over other OOB channels as described herein.

In at least one embodiment, the controller can adjust a transmit power of the UWB based on a distance between the controller and one or more controlees. In at least one embodiment, the controller can store a lookup table that includes different power level values for multiple distances. The controller can determine a distance between the controller and a controlee using the ranging results, as described above. Using the distance, the controller can look up a value for the transmit power level associated with that distance for a particular channel. An example of a lookup table is illustrated in FIG. 11A.

FIG. 11A is a lookup table 1100 with transmit power values associated with different channels and distances, according to at least one embodiment. The lookup table 1100 can store a value associated with a transmit power level for each wireless channel for multiple distances. The controller can determine a distance and use the distance and the assigned wireless channel to look up a value for the transmit power level to be used for the UWB radio. For example, if a first controlee is 6 meters away from the controller and the controller is communicating with the first controlee on channel 9, a value of 71.312543 dB is used for the transmit power to transfer data to the first controlee. A second controlee might be 5 meters away, and the controller is communicating with the second controlee on channel 5, a value of 65.73767 dB is used for the transmit power to transfer data to the second controlee.

In at least one embodiment, as illustrated in FIG. 11A, the lookup table 1110 can store values for a first path loss model 1102 (e.g., IEEE Path loss Model B) and values for a second path loss model 1104 (e.g., IEEE Path loss Model C). In the example of the first controlee being 6 meters away, the controller can determine a value of 72.321254 for the transmit power level using the second path loss model.

FIG. 11B illustrates a link budget 1150 for a data transfer between a controller and a controlee, according to at least one embodiment. As illustrated in the link budget 1150, a total tolerable path loss is 81.7 dB, so even with a maximum transmit power, an average distance will be about 10 meters with 19% channel occupancy. Using the tables, the controller can perform distance-aware power control for interference reduction and co-existence. In at least one embodiment, the power control can be reduced by 10 dB via the distance-aware power control to achieve the needed data rate while minimizing interference.

FIG. 11C illustrates a link budget 1160 for a data transfer between a controller and a controlee, according to at least one embodiment. As illustrated in the link budget 1160, a total tolerable path loss is 77.7 dB, so even with a maximum transmit power, an average distance will be about 8 meters with 17% channel occupancy. Using the tables, the controller can perform distance-aware power control for interference reduction and co-existence. In at least one embodiment, the power control can be reduced by 6 dB via the distance-aware power control to achieve the needed data rate while minimizing interference.

Figure 12:
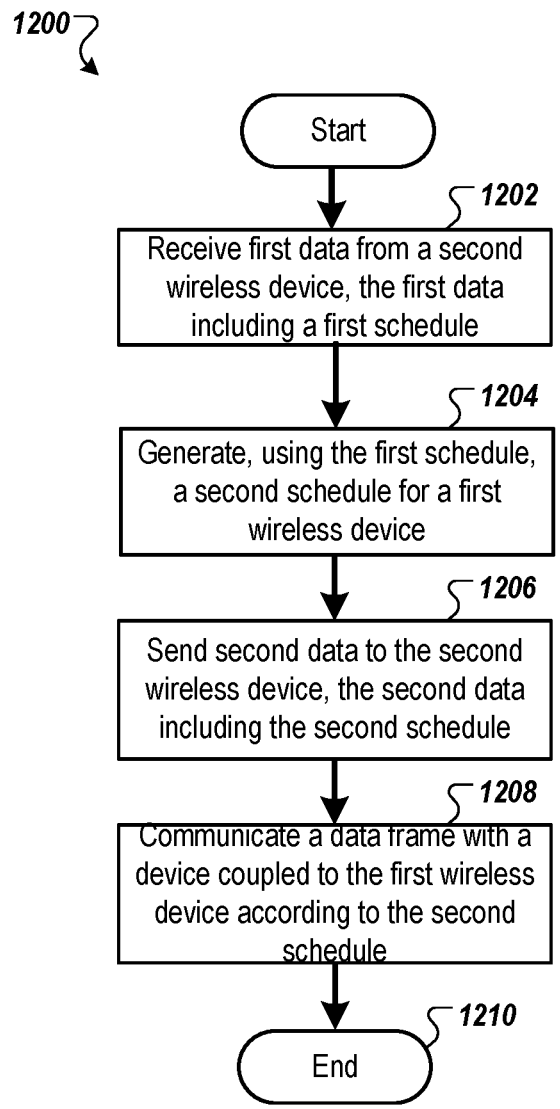
FIG. 12 is a flow diagram of a method of operating a controller according to at least one embodiment.

FIG. 12 is a flow diagram of a method 1220 of operating a controller according to at least one embodiment. The method 1200 may be performed by processing logic that comprises hardware (e.g., circuitry, dedicated logic, programmable logic, microcode, etc.), software, firmware, or a combination thereof. In one embodiment, the method 1200 may be performed by the first wireless device 102 of FIG. 1. In another embodiment, the method 700 is performed by the UWB radio 106 of FIG. 1. In another embodiment, the method 700 is performed by the MAC circuitry of the UWB radio 106 of FIG. 1. In another embodiment, the method 700 is performed by any wireless device described herein.

Referring back to FIG. 12, the processing logic of a first wireless device having a UWB radio begins the method 1200 by receiving first data from an application (block 1202). The processing logic sends second data to a second wireless device using the UWB radio (block 1204). The second data identifies a number of data rounds, a duration of each round, a duration of a data slot, a duration of a data block, and a first slot index that identifies the second wireless device and a second slot index that identifies the third wireless device. During a first slot associated with the first slot index in a first data round, the processing logic sends at least a first portion of the first data to the second wireless device using the UWB radio (block 1206). During a second slot associated with the second slot index associated with the second slot index in the first data round, the processing logic sends at least a second portion of the first data to the second wireless device using the UWB radio (block 1208); and the method 1200 ends.

In one embodiment, the processing logic sends, as part of the second data, a first RCM. The first RCM can include: i) a first value that indicates a data transfer mode; ii) a second value that indicates the number of data rounds; iii) a third value indicating the duration of the data block; iv) a fourth value indicating the duration of the data round; v) a fifth value indicating the duration of the data slot; vi) the first slot index; and vii) an address of the second wireless device. Alternatively, the processing logic can send one or more messages and one or more information elements to convey the second data and the third data to the second wireless device and the third wireless device, respectively.

In at least one embodiment, the processing logic receives, from the second wireless device via the UWB radio, a first ACK in response to sending the first data to the second wireless device and receives, from the third wireless device via the UWB radio, a second ACK in response to sending the first data to the third wireless device.

In at least one embodiment, the processing logic establishes a first wireless connection with the second wireless device using a second radio and a second wireless connection with the third wireless device using the second radio. The processing logic can receive, from the second wireless device via the second radio, a first ACK in response to the first RCM and a third ACK in response to sending the first data to the second wireless device. The processing logic can receive, from the third wireless device via the second radio, a second ACK in response to the first RCM, and a fourth ACK in response to sending the first data to the third wireless device. In at least one embodiment, the ACKs are received via an OOB channel. In another embodiment, the ACKs are received on the same wireless channel as being used to transfer data.

In at least one embodiment, the processing logic sends, during the first slot, the first data to the second wireless device by sending a first message with at least the first portion of the first data and a first RAICT information element. The first RAICT information element includes a first message number that identifies the first message and a first number of frames remaining to complete a first data message exchange. During the second slot, the processing logic sends the first data to the third wireless device by sending a second message with at least the second portion of the first data and a second RAICT information element. The second RAICT information element includes a second message number that identifies the second message and a second number of frames remaining to complete a second data message exchange.

In at least one embodiment, the processing logic sends the first data to the second wireless device in a first message in a first round on a first wireless channel and a second message to the third wireless device in the first round on the second wireless channel. The processing logic sends a third message to the second wireless device in a second round on a second wireless channel and a fourth message to the third wireless device in the second round on the second wireless channel.

In at least one embodiment, the processing logic sends fourth data to a fourth wireless device using the UWB radio. The fourth data identifies the number of data rounds, the duration of each round, the duration of the data slot, the duration of the data block, and a third slot index. During a third slot subsequent to the second slot, the processing logic sends the first data from the application to the fourth wireless device using the UWB radio.

In at least one embodiment, the processing logic initiates a first session and a second session and sends, during a first data round, a first message to the second wireless device on a first wireless channel during the first session, and, during a second data round, a second message to the second wireless device on a second wireless channel during the second session.

In at least one embodiment, the processing logic sends the first data to the third wireless device using the UWB radio by sending, during the first data round, a third message to the third wireless device on the first wireless channel during the first session, and sending, during the second data round, a fourth message to the third wireless device on the second wireless channel during the second session.

In at least one embodiment, the processing logic establishes a first wireless connection with the second wireless device using a second radio. The processing logic determines a distance between the first wireless device and the second wireless device using UWB ranging. The processing logic sets a first transmit power value for the UWB radio based on the distance using a lookup table. The processing logic sets the first transmit power level value to send the first data to the second wireless device.

In at least one embodiment, the processing logic receives, from the second wireless device via the second radio, a first ACK in response to sending the first data to the second wireless device. The processing logic adjusts the first transmit power value to a second transmit power value based on the first ACK. The processing logic sends additional data to the second wireless device using the UWB radio set to the second transmit power value during a subsequent slot.

Figure 13:
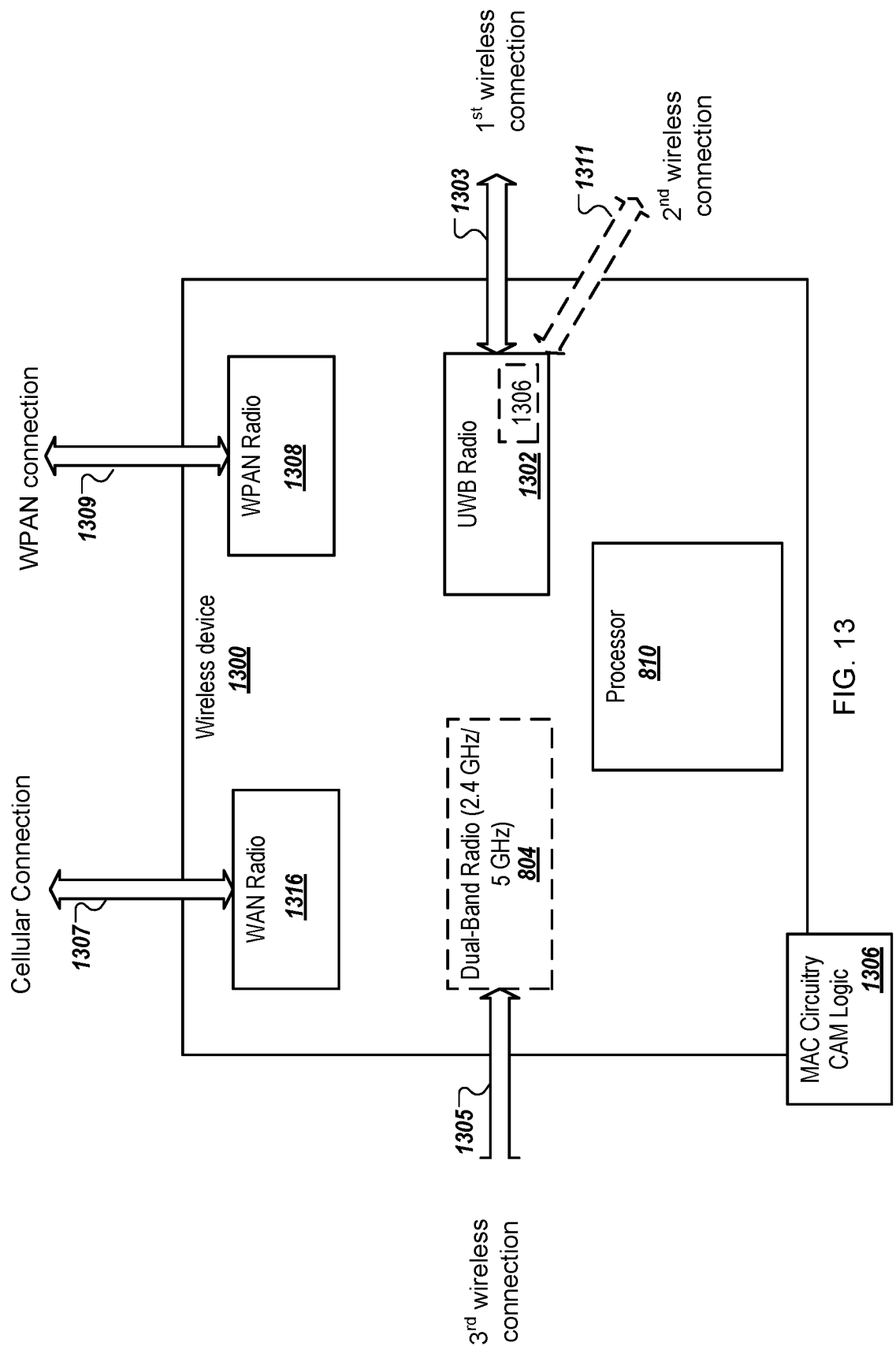
FIG. 13 is a block diagram of a wireless device with multiple radios and a UWB radio for data transfers according to one embodiment.

FIG. 13 is a block diagram of a wireless device 1300 with multiple radios and a UWB radio for data transfers according to one embodiment. The wireless device 1300 includes a UWB radio 1302, a dual-band radio 1304, an optional cellular radio 1316, an optional wireless personal area network (WPAN) radio 1308, and a processor 1310. The processor 1310 can be any type of processing device that can implement operations associated with MAC circuitry 1306, such as described above with respect to FIGS. 1-12. The UWB radio 1302 creates a first wireless connection 1303 between the wireless device 1300 and a second wireless device. The dual-band radio 1304 creates a third wireless connection 1305 between the wireless device 1300 and an endpoint device in a second network. The third wireless connection 1305 can be a peer-to-peer wireless connection or peer-to-multiple-peers wireless connections. The optional cellular radio 1316 creates a cellular connection between the wireless device 1300 and a device in a cellular network (not illustrated). The optional WPAN radio 1308 can create a wireless connection between the wireless device 1300 and a device in a WPAN. The WPAN radio 1308 can be a radio that implements the Bluetooth® technology, ZigBee® technology, Zwave® technology, or the like.

In another embodiment, the wireless device 1300 includes UWB radio, such as the UWB radio that establishes the first wireless connection 1303 between the wireless device 1300 and one or more additional wireless device, such as the controlees described herein. For example, the UWB radio 1302 can establish a first wireless connection 1303 with a second wireless device and a second wireless connection 1311 with a third wireless device. The MAC circuitry 1306 can be implemented in a wireless device with a single radio or multiple radios.

During operation, the wireless device 1300 can receive a request to playback a first content file. The request may originate from an application running on the processor 1310. Alternatively, the wireless device 1300 can request the content file on behalf of another client or endpoint device. The wireless device 1300 sends data associated with the request to the second wireless device through the first wireless connection 1303. For example, the wireless device 1300 can send audio content or portions of the audio content to the second wireless device via the first wireless connection 1303 and the audio content or other portions of the audio content to a third wireless device via a second wireless connection 1311. The second wireless device can include a speaker that plays the audio content received over the first wireless connection 1303. Similarly, the third wireless device can include a speaker that plays the audio content received over the second wireless connection 1311. The processor 1310 can process the first content file and send video data to a connected display. Alternatively, the processor 1310 can send the video over a wired or wireless connection to another device to be rendered on a display. In some embodiments, the wireless device 1300 receives the first content file through one or more intervening devices between the wireless device and a content server of a content delivery network (CDN) or from a gateway of a home network.

In some embodiments, the wireless connection 1303 and 1311 are over UWB. The third wireless connection 1305 is a WLAN connection that operates in a first frequency range (e.g., 2.4 GHz frequency band) or a second frequency range (e.g., any of the 5 GHz frequency bands). The wireless device 1300 can also use the WPAN radio 1308 to establish a separate OOB communication channel to the devices in which data is being transferred by the UWB radio 1302, as described herein.

In various embodiments, the wireless device 1300 may include memory, storage, one or more wired communication interfaces, two or more wireless communication interfaces, one or more processing devices, or the like. The communication interface, which may include one or more network devices for connecting to the Internet, may be adapted to also wirelessly couple the wireless device 1300 to one or more network devices of a first network (e.g., a first AP). The processor 1310 can process various data including, for example, topology information, such as node location, historical interference event data (e.g., which devices detected interference events on which channels), historical data transfer rate requirements (e.g., from applications on the client wireless devices), historical application-based throughout and latency requirements (e.g., by content streaming applications of the client wireless devices over particular channels), per-channel antenna configurations, and channel congestion data associated with particular channels on which the multiple wireless devices communicate. The data may further include information associated with, or useable to determine, pattern recognition and learning associated with radar event detection, data bandwidth requirements, and latency requirements, and the like. The data may also include scan lists, proximity data, dynamic frequency selection (DFS) channels, requirement sets, or the like.

The wireless device 1300 can communicate with other devices on a network. The network may be representative of an Internet or WAN connection. Such an Internet or WAN connection may include additional links or trunks, whether wired or wireless, that may involve other types of wideband communication, including those based on cellular standard(s).

In at least one embodiment, wireless device 1300 includes a UWB radio 1302 and a host processor, such as processor 1310. The host processor executes an application, such as an audio application. The host processor initiates at least one session to send the first data from the application to a second wireless device and a third wireless device. The UWB radio 1302 is coupled to the host processor, or the UWB radio includes MAC circuitry 1306. The MAC circuitry 1306 is configured to receive the first data from the application. The MAC circuitry 1306 sends second data to the second wireless device. The second data identifies a number of data rounds, a duration of each round, a duration of a data slot, a duration of a data block, and a first slot index. The MAC circuitry 1306 sends third data to the third wireless device. The third data identifies the number of data rounds, the duration of each round, the duration of a data slot, the duration of the data block, and a second slot index. The MAC circuitry 1306 sends, during a first slot, the first data to the second wireless device. The MAC circuitry 1306 sends the first data to the third wireless device during a second slot subsequent to the first slot.

In another embodiment, the MAC circuitry 1306 establishes a first wireless connection with the second wireless device using a second radio, such as WPAN radio 1308. The MAC circuitry 1306 establishes a second wireless connection with the third wireless device using the second radio. The MAC circuitry 1306 receives, from the second wireless device via the second radio, a first ACK in response to sending the second data. The MAC circuitry 1306 receives a second ACK from the third wireless device via the second radio in response to sending the third data. The MAC circuitry 1306 receives a third ACK from the second wireless device via the second radio in response to sending the first data to the second wireless device. The MAC circuitry 1306 receives a fourth ACK from the third wireless device via the second radio in response to sending the first data to the third wireless device.

In at least one embodiment, the MAC circuitry 1306 sends, during the first slot, the first data to the second wireless device by sending a first message including the first data and a first RAICT information element. The first RAICT information element includes a first message number and a first number of frames remaining to complete a first data message exchange. The MAC circuitry 1306 sends, during the second slot, the first data to the third wireless device by sending a second message with the first data and a second RAICT information element. The second RAICT information element includes a second message number and a second number of frames remaining to complete a second data message exchange.

In at least one embodiment, the MAC circuitry 1306 initiates a first session for sending the first data to the second wireless device and initiates a second session for sending the first data to the third wireless device. In another embodiment, the host processor initiates the first and second sessions. The MAC circuitry 1306 sends the first data to the second wireless device by sending the first data to the second wireless device on a first wireless channel during the first session. The MAC circuitry 1306 sends the first data to the third wireless device by sending the first data to the fourth wireless device on a second wireless channel during the second session.

In at least one embodiment, the MAC circuitry 1306 establishes a first wireless connection with the second wireless device using a second radio. The MAC circuitry 1306 determines a distance between the first wireless device and the second wireless device using UWB ranging. The MAC circuitry 1306 sets a first transmit power value for the UWB radio based on the distance using a lookup table. The first data is sent to the second wireless device with the UWB radio set to the first transmit power. The MAC circuitry 1306 receives, from the second wireless device via the second radio, a first ACK in response to sending the first data to the second wireless device. The MAC circuitry 1306 adjusts the first transmit power value to a second transmit power value for the UWB radio based on the first ACK. The MAC circuitry 1306 sends, during a subsequent slot, additional data to the second wireless device using the UWB radio set to the second transmit power value.

Figure 14:
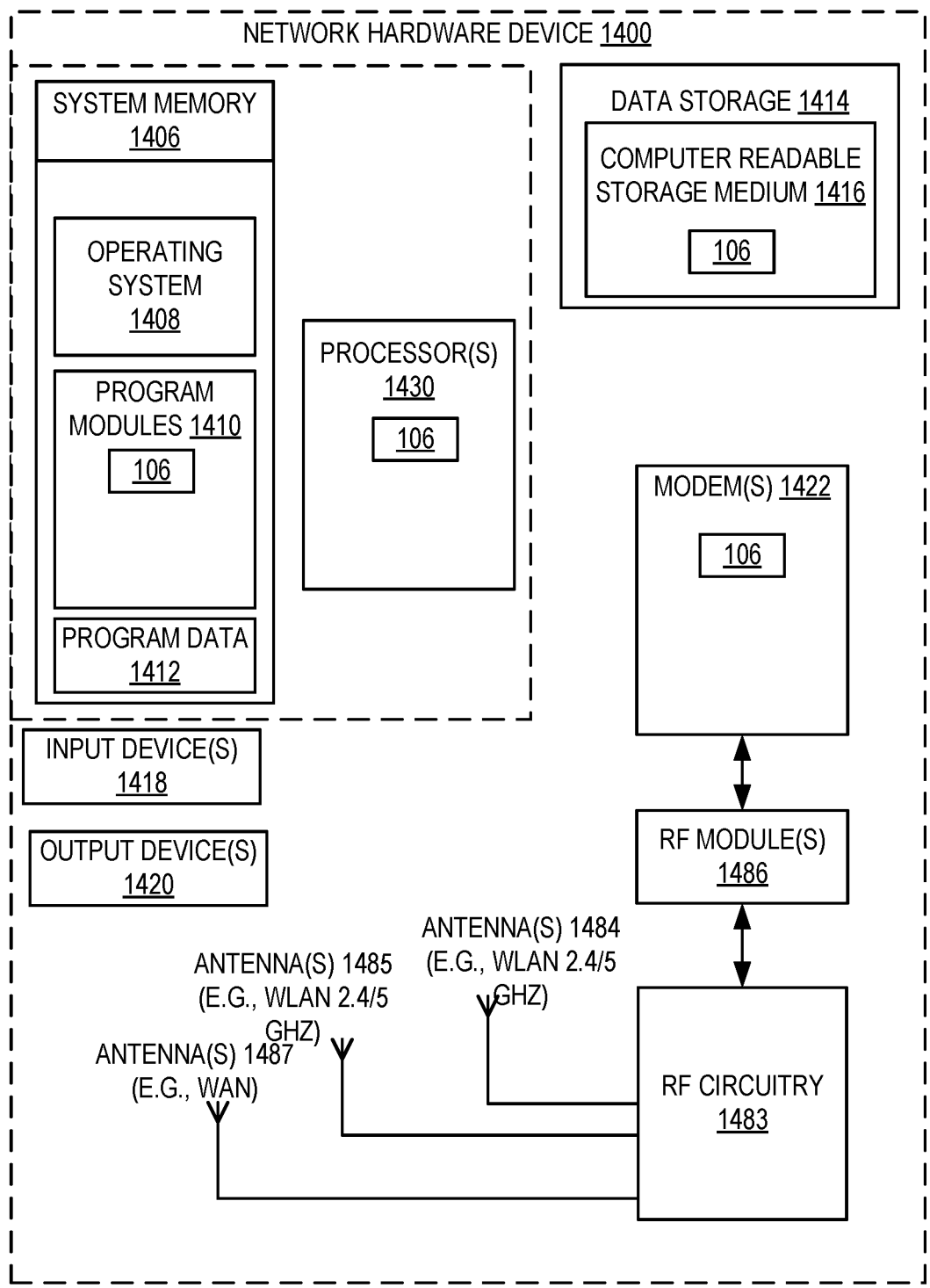
FIG. 14 is a block diagram of a wireless device for UWB data transfers in a wireless network according to one embodiment.

FIG. 14 is a block diagram of a wireless device 1400 for UWB data transfers in a wireless network according to one embodiment. The wireless device 1400 may correspond to the mesh network devices described above with respect to FIGS. 1-12. Alternatively, the wireless device 1400 may be other electronic devices, as described herein.

The wireless device 1400 includes one or more processor(s) 1430, such as one or more CPUs, microcontrollers, field-programmable gate arrays, or other types of processors. The wireless device 1400 also includes system memory 1406, which may correspond to any combination of volatile and/or non-volatile storage mechanisms. The system memory 1406 stores information that provides operating system component 1408, various program modules 1410, program data 1412, and/or other components. In one embodiment, the system memory 1406 stores instructions of methods to control the operation of the wireless device 1400. The wireless device 1400 performs functions by using the processor(s) 1430 to execute instructions provided by the system memory 1406. In one embodiment, the program modules 1410 may include MAC circuitry 1306. The MAC circuitry 1306 may perform some of the operations of reducing medium access contention described herein.

The wireless device 1400 also includes a data storage device 1414 that may be composed of one or more types of removable storage and/or one or more types of non-removable storage. The data storage device 1414 includes a computer-readable storage medium 1416 on which is stored one or more sets of instructions embodying any of the methodologies or functions described herein. Instructions for the program modules 1410 (e.g., MAC circuitry 1306) may reside, completely or at least partially, within the computer-readable storage medium 1416, system memory 1406, and/or within the processor(s) 1430 during execution thereof by the wireless device 1400, the system memory 1406 and the processor(s) 1430 also constituting computer-readable media. The wireless device 1400 may also include one or more input devices 1418 (keyboard, mouse device, specialized selection keys, etc.) and one or more output devices 1420 (displays, printers, audio output mechanisms, etc.).

The wireless device 1400 further includes a modem 1422 to allow the wireless device 1400 to communicate via a wireless connection (e.g., such as provided by the wireless communication system) with other computing devices, such as remote computers, an item providing system, and so forth. The modem 1422 can be connected to one or more radio frequency (RF) modules 1486. The RF modules 1486 may be a WLAN module, a WAN module, PAN module, GPS module, or the like. The antenna structures (antenna(s) 1484, 1485, 1487) are coupled to the RF circuitry 1483, which is coupled to the modem 1422. The RF circuitry 1483 may include radio front-end circuitry, antenna-switching circuitry, impedance matching circuitry, or the like. The antennas 1484 may be GPS antennas, NFC antennas, other WAN antennas, WLAN or PAN antennas, or the like. The modem 1422 allows the wireless device 1400 to handle both voice and non-voice communications (such as communications for text messages, multimedia messages, media downloads, web browsing, etc.) with a wireless communication system. The modem 1422 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Wi-Fi®, Long Term Evolution (LTE) and LTE Advanced (sometimes generally referred to as 4G), etc.

The modem 1422 may generate signals and send these signals to the antenna(s) 1484 of a first type (e.g., WLAN 5 GHz), antenna(s) 1485 of a second type (e.g., WLAN 2.4 GHz), and/or antenna(s) 1487 of a third type (e.g., WAN), via RF circuitry 1483, and RF module(s) 1486 as described herein. Antennas 1484, 1485, 1487 may be configured to transmit in different frequency bands and/or using different wireless communication protocols. The antennas 1484, 1485, 1487 may be directional, omnidirectional, or non-directional antennas. In addition to sending data, antennas 1484, 1485, 1487 may also receive data, which is sent to appropriate RF modules connected to the antennas. One of the antennas 1484, 1485, 1487 may be any combination of the antenna structures described herein.

In one embodiment, the wireless device 1400 establishes a first connection using a first wireless communication protocol, and a second connection using a different wireless communication protocol. The first wireless connection and second wireless connection may be active concurrently, for example, if a wireless device is receiving a media item from another wireless device (e.g., a mini-POP node) via the first connection) and transferring a file to another electronic device (e.g., via the second connection) at the same time. Alternatively, the two connections may be active concurrently during wireless communications with multiple devices. In one embodiment, the first wireless connection is associated with a first resonant mode of an antenna structure that operates at a first frequency band, and the second wireless connection is associated with a second resonant mode of the antenna structure that operates at a second frequency band. In another embodiment, the first wireless connection is associated with a first antenna structure, and the second wireless connection is associated with a second antenna. In other embodiments, the first wireless connection may be associated with content distribution within mesh nodes of the WMN, and the second wireless connection may be associated with serving a content file to a client consumption device, as described herein.

Though a modem 1422 is shown to control transmission and reception via the antenna (1484, 1485, 1487), the wireless device 1400 may alternatively include multiple modems, each of which is configured to transmit/receive data via a different antenna and/or wireless transmission protocol.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A first wireless device comprising:
   a host processor that executes an audio application that retrieves audio data from the Internet;
   an ultra-wideband (UWB) radio coupled to the host processor, the UWB radio comprising media access control (MAC) circuitry, wherein:
      the MAC circuitry generates and sends a first ranging control message (RCM) to a second wireless device and a third wireless device, the first RCM comprising: i) a first value that indicates a data transfer mode; ii) a second value that indicates a number of data rounds following the first RCM that are used to transfer the audio data; iii) a third value indicating a duration of a data block in which the number of data rounds occur; iv) a fourth value indicating a duration of each of the data rounds; v) a fifth value indicating a duration of a data slot within each of the data rounds; vi) a first slot index that identifies a first slot in which the second wireless device is scheduled to receive the audio data and a second slot index that identifies a second slot in which the third wireless device is scheduled to receive the audio data; and vii) an address of the second wireless device and an address of the third wireless device;
      the MAC circuitry generates and sends, during a first slot, a first message to the second wireless device, the first message comprising at least a portion of the audio data; and
      the MAC circuitry generates and sends, during a second slot subsequent to the first slot, a second message to the third wireless device, the second message comprising at least a portion of the audio data.

2. The first wireless device of claim 1, further comprising a personal area network (PAN) radio coupled to the host processor, wherein:
   the host processor establishes a first wireless connection with the second wireless device using the PAN radio and a second wireless connection with the third wireless device using the PAN radio;
   the host processor receives, from the second wireless device via the PAN radio, a first acknowledgment (ACK) in response to the first message; and the host processor receives, from the third wireless device via the PAN radio, a second ACK in response to the second message.

3. The first wireless device of claim 1, wherein:
the MAC circuitry generates and sends, during a first data round, the first message to the second wireless device on a first wireless channel during a first session; and
the MAC circuitry generates and sends, during a second data round, a subsequent message to the second wireless device on a second wireless channel during a second session.

4. The first wireless device of claim 3, wherein:
the MAC circuitry generates and sends, during a third data round, a third message to the second wireless device on the first wireless channel during the first session.

5. A method of operating a first wireless device comprising an ultra-wideband (UWB) radio, the method comprising:
receiving first data from an application;
sending second data to a second wireless device and a third wireless device using the UWB radio, the second data identifying a number of data rounds, a duration of each data round of the number of data rounds, a duration of a data slot, and a first slot index that identifies the second wireless device and a second slot index that identifies the third wireless device;
sending, during a first slot associated with the first slot index in a first data round, at least a first portion of the first data to the second wireless device using the UWB radio; and
sending, during a second slot associated with the second slot index in the first data round, at least a second portion of the first data to the third wireless device using the UWB radio.

6. The method of claim 5, wherein the second data comprises:
i) a first value that indicates a data transfer mode; and
ii) an address of the second wireless device assigned to the first slot index and an address of the third wireless device assigned to the second slot index.

7. The method of claim 6, further comprising:
receiving, from the second wireless device via the UWB radio, a first acknowledgment (ACK) in response to sending the first data to the second wireless device; and
receiving, from the third wireless device via the UWB radio, a second ACK in response to sending the first data to the third wireless device.

8. The method of claim 6, further comprising:
establishing a first wireless connection with the second wireless device using a second radio;
establishing a second wireless connection with the third wireless device using the second radio;
receiving, from the second wireless device via the second radio, a first acknowledgment (ACK) in response to sending the first data to the second wireless device; and
receiving, from the third wireless device via the second radio, a second ACK in response to sending the first data to the third wireless device.

9. The method of claim 5, wherein:
the at least the first portion of the first data comprises the at least the first portion of the first data comprises a first Ranging Ancillary Information Message Counter and Type (RAICT) information element comprising a first message number that identifies a first message containing the at least the first portion of the first data and a first number of frames remaining to complete a first data message exchange with the second wireless device; and the at least the second portion of the first data comprises a second RAICT information element comprising a second message number that identifies a second message containing the at least the second portion of the first data and a second number of frames remaining to complete a second data message exchange with the third wireless device.

10. The method of claim 5, wherein:
sending the first data to the second wireless device comprises sending a first message in a first round on a first wireless channel;
sending the first data to the third wireless device comprises sending a second message in the first round on the first wireless channel;
sending a third message to the second wireless device in a second round on a second wireless channel; and
sending a fourth message to the third wireless device in the second round on the second wireless channel.

11. The method of claim 5, further comprising:
sending fourth data to a fourth wireless device using the UWB radio, the fourth data identifying the number of data rounds, the duration of each round, the duration of the data slot, and a third slot index; and
sending, during a third slot subsequent to the second slot, the first data to the fourth wireless device using the UWB radio.

12. The method of claim 5, wherein sending the first data to the second wireless device comprises:
sending, during a first data round, a first message to the second wireless device on a first wireless channel during a first session; and
sending, during a second data round, a second message to the second wireless device on a second wireless channel during a second session.

13. The method of claim 12, wherein sending the first data to the third wireless device comprises sending, during the first data round, a third message to the third wireless device on the first wireless channel during the first session; and
sending, during the second data round, a fourth message to the third wireless device on the second wireless channel during the second session.

14. The method of claim 5, further comprising:
establishing a first wireless connection with the second wireless device using a second radio;
determining a distance between the first wireless device and the second wireless device; and
setting a first transmit power value for the UWB radio, wherein the sending the first data comprises sending the first data using the UWB radio set to the first transmit power value.

15. The method of claim 14, further comprising:
receiving, from the second wireless device via the second radio, a first acknowledgment (ACK) in response to sending the first data to the second wireless device; and
adjusting the first transmit power value to a second transmit power value for the UWB radio based on the first ACK; and
sending, during a subsequent slot, additional data to the second wireless device using the UWB radio set to the second transmit power value.

16. A first wireless device comprising:
a host processor that executes an application, the host processor initiates at least one session to send first data from the application to a second wireless device and a third wireless device; and an ultra-wideband (UWB) radio coupled to the host processor, the UWB radio comprising media access control (MAC) circuitry, wherein the MAC circuitry is to:
receive the first data from the application;
send second data to the second wireless device and the third wireless device, the second data identifying a number of data rounds, a duration of each round, a duration of a data slot, a first slot index that identifies the second wireless device and a second slot index that identifies the third wireless device;
send, during a first slot associated with the first slot index in a first data round, at least a first portion of the first data to the second wireless device; and
send, during a second slot associated with the second slot index, at least a second portion of the first data to the third wireless device.

17. The first wireless device of claim 16, wherein the MAC circuitry is further to:
establish a first wireless connection with the second wireless device using a second radio;
establish a second wireless connection with the third wireless device using the second radio;
receive, from the second wireless device via the second radio, a first acknowledgment (ACK) in response to sending the first data to the second wireless device; and
receive, from the third wireless device via the second radio, a second ACK in response to sending the first data to the third wireless device.

18. The first wireless device of claim 16, wherein:
the at least the first portion of the first data comprises a first Ranging Ancillary Information Message Counter and Type (RAICT) information element comprising a first message number that identifies a first message containing the at least the first portion of the first data and a first number of frames remaining to complete a first data message exchange with the second wireless device; and
the at least the second portion of the first data comprises a second RAICT information element comprising a second message number that identifies a second message containing the at least the second portion of the first data and a second number of frames remaining to complete a second data message exchange with the third wireless device.

19. The first wireless device of claim 16, wherein the MAC circuitry is further to:
send the first data to the second wireless device by sending, during a first data round, a first message to the second wireless device on a first wireless channel during a first session; and
send the first data to the third wireless device by sending, during a second data round, a second message to the second wireless device on a second wireless channel during a second session.

20. The first wireless device of claim 16, wherein the MAC circuitry is further to:
establish a first wireless connection with the second wireless device using a second radio;
determine a distance between the first wireless device and the second wireless device;
set a first transmit power value for the UWB radio, wherein the first data is sent to the second wireless device with the UWB radio set to the first transmit power value;
receive, from the second wireless device via the second radio, a first acknowledgment (ACK) in response to sending the first data to the second wireless device; and
adjust the first transmit power value to a second transmit power value for the UWB radio based on the first ACK; and
send, during a subsequent slot, additional data to the second wireless device using the UWB radio set to the second transmit power value.

\* \* \* \* \*